(12) United States Patent
Hikima et al.

(10) Patent No.: US 12,614,958 B2
(45) Date of Patent: Apr. 28, 2026

(54) STATOR ASSEMBLY APPARATUS AND STATOR ASSEMBLY METHOD

(71) Applicant: HONDA MOTOR CO., LTD., Tokyo (JP)

(72) Inventors: Norihiko Hikima, Tokyo (JP); Yasuto Ohashi, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 543 days.

(21) Appl. No.: 18/058,274

(22) Filed: Nov. 23, 2022

(65) Prior Publication Data

US 2023/0170773 A1 Jun. 1, 2023

(30) Foreign Application Priority Data

Nov. 29, 2021 (JP) ................................. 2021-193167

(51) Int. Cl.
H02K 15/066 (2025.01)
B21F 3/00 (2006.01)
H02K 15/085 (2006.01)

(52) U.S. Cl.
CPC ............. H02K 15/085 (2013.01); B21F 3/00 (2013.01); H02K 15/066 (2013.01)

(58) Field of Classification Search
CPC ........................... H02K 15/085; H02K 15/066
See application file for complete search history.

(56) References Cited

U.S. PATENT DOCUMENTS

2020/0220438 A1 7/2020 Ide et al.
2022/0149675 A1* 5/2022 Hashimoto ............ H02K 15/10

FOREIGN PATENT DOCUMENTS

| CN | 110892618 A | 3/2020 |
| JP | 2021136755 A | * 9/2012 |
| JP | 2018038180 A | 3/2018 |
| JP | 2018170881 A | 11/2018 |
| JP | 6733823 B2 | 8/2020 |
| JP | 2020137204 A | 8/2020 |

OTHER PUBLICATIONS

Office Action issued Oct. 22, 2025 in the CN Patent Application No. 202211485419.1.

* cited by examiner

*Primary Examiner* — Livius R. Cazan
(74) *Attorney, Agent, or Firm* — CKC & PARTNERS CO., LLC

(57) ABSTRACT

There are provided first guide members inserted into the insides of the insulating members in the slots, second guide members inserted into the insides of the insulating members and onto outer sides relative to the first guide members in a radial direction in the slots, and a controller controlling movement of each of the first guide members and the second guide members. After the first guide member moves outward in the radial direction in the slot until coming into contact with or close to a second guide member, the plurality of second guide members are caused to sequentially move to an outer side of the stator core in the central axis direction in order with the second guide member closest to the first guide members first and retreat from the slot as the coil is moved outward in the radial direction by the pressers.

10 Claims, 26 Drawing Sheets

FIG. 10G

FIG. 13H
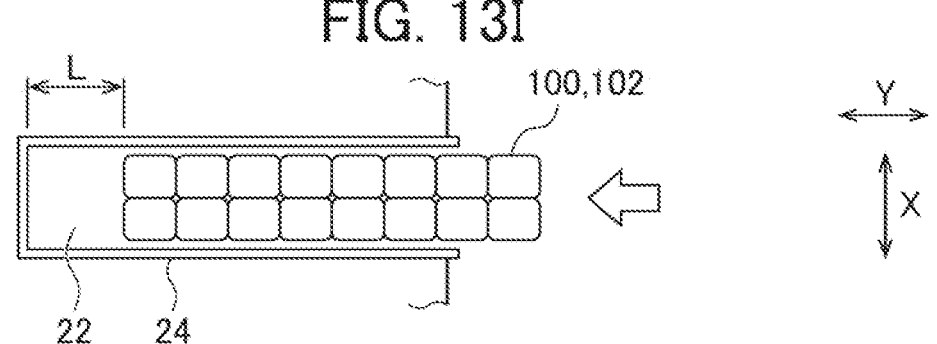
FIG. 13I
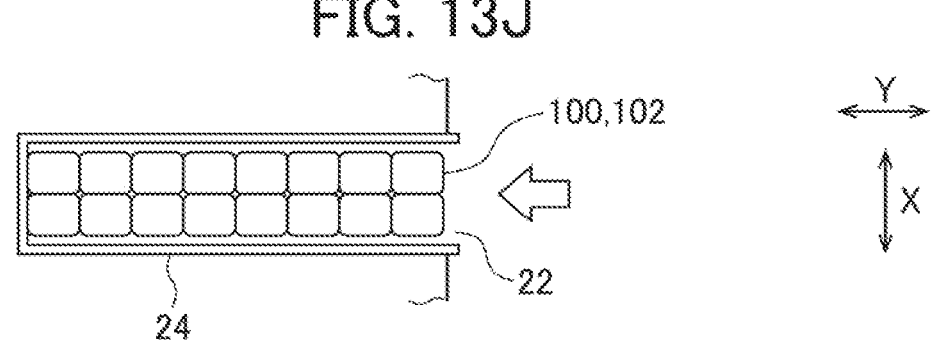
FIG. 13J

STATOR ASSEMBLY APPARATUS AND STATOR ASSEMBLY METHOD

This application is based on and claims the benefit of priority from Japanese Patent Application No. 2021-193167, filed on 29 Nov. 2021, the content of which is incorporated herein by reference.

BACKGROUND OF THE INVENTION

Field of the Invention

The present invention relates to a stator assembly apparatus and a stator assembly method.

Related Art

Conventionally, the technology described in Patent Document 1 has been known as a technology for inserting a coil into slots of a stator core in which insulating members are mounted, from inside the stator core while preventing the insulating members from being caught.

In the technology described in Patent Document 1, two guide jigs are inserted into each of the slots of the stator core in which the insulating members are mounted before insertion of the coil, from outside in the central axis direction of the stator core to open each of the insulating members. In that state, the coil is moved in each slot while being applied to one guide jig. After guide members mutually come into contact, the two guide jigs are retreated from inside the slot.

Patent Document 1: Japanese Patent No. 6733823

SUMMARY OF THE INVENTION

However, in the technology described in Patent Document 1, since the coil further moves in each slot after the guide jigs retreats from inside the slot, the coil comes into contact with the insulating member when the coil moves. When the coil comes into contact with the insulating member, there is a possibility that the insulating member is caught between the coil and the slot, and the insulating member is twisted or buckled as the coil moves.

An object of the present invention is to provide a stator assembly apparatus and a stator assembly method capable of, at the time of inserting a coil into slots from inside a stator core, inserting the coil without catching insulating members mounted in the slots.

(1) A stator assembly apparatus according to the present invention is a stator assembly apparatus (for example, a stator assembly apparatus 1 described later) for assembling a stator (for example, a stator 200 described later) by inserting a coil (for example, a belt-shaped coil 100 described later) into slots (for example, slots 22 described later) of a stator core (for example, a stator core 2 described later) in which insulating members (for example, pieces of insulating paper 24 described later) are mounted, from inside the stator core, the stator assembly apparatus including: pressers (for example, coil pressers 51 described later) pressing the coil outward in a radial direction to cause the coil to move into insides of the insulating members in the slots; first guide members (for example, leading guide members 61 described later) provided movably along a central axis direction of the stator core and inserted into the insides of the insulating members in the slots by moving toward the stator core, each one of the slots being provided with at least one of the first guide members; second guide members (for example, reinforcing guide members 62, first reinforcing guide member 62a, second reinforcing guide member 62b and third reinforcing guide member 62c described later) provided movably along the central axis direction of the stator core and inserted into the insides of the insulating members and onto outer sides relative to the first guide members in the radial direction in the slots by moving toward the stator core, each one of the slots being provided with a plurality of the second guide members; and a controller (for example, a controller 10 described later) controlling movement of each of the first guide members and the second guide members along the central axis direction of the stator core; the at least one of the first guide members being positioned ahead in a movement direction of the coil moved by the pressers, in a state of being inserted in the slot, and being provided movably outward in the radial direction in the slot by being pushed by the coil; and the controller performing control so as to, after the at least one of the first guide members moves outward in the radial direction in the slot until coming into contact with or close to a second guide member arranged on a radially inner side among the plurality of second guide members, cause the plurality of second guide members to sequentially move to an outer side of the stator core in the central axis direction in order with the second guide member closest to the at least one of the first guide members first and retreat from the slot as the coil is moved outward in the radial direction by the pressers.

(2) A stator assembly apparatus according to the present invention is a stator assembly apparatus (for example, the stator assembly apparatus 1 described later) for assembling a stator (for example, the stator 200 described later) by inserting a coil (for example, the belt-shaped coil 100 described later) into slots (for example, the slots 22 described later) of a stator core (for example, the stator core 2 described later) in which insulating members (for example, the pieces of insulating paper 24 described later) are mounted, from inside the stator core, the stator assembly apparatus including: pressers (for example, the coil pressers 51 described later) pressing the coil outward in a radial direction to cause the coil to move into insides of the insulating members in the slots; first guide members (for example, the leading guide members 61 described later) provided movably along a central axis direction of the stator core and inserted into the insides of the insulating members in the slots by moving toward the stator core, each one of the slots being provided with at least one of the first guide members; second guide members (for example, the reinforcing guide members 62, the first reinforcing guide member 62a, the second reinforcing guide member 62b and the third reinforcing guide member 62c described later) provided movably along the central axis direction of the stator core and inserted into the insides of the insulating members and onto outer sides relative to the first guide members in the radial direction in the slots by moving toward the stator core, each one of the slots being provided with a plurality of the second guide members; and a controller (for example, the controller 10 described later) controlling movement of each of the first guide members and the second guide members along the central axis direction of the stator core; the at least one of the first guide members being positioned ahead in a movement direction of the coil moved by the pressers, in a state of being inserted in the slot, and being provided movably outward in the radial direction in the slot by being pushed by the coil; and the controller performing control so as to, after the at least one of the first guide members moves outward in the radial direction in the slot until coming into contact with or close to a second guide member arranged on a radially inner side among the plurality of second guide members, cause the at least one of the first guide members to move outward in the central axis direction of the stator core and retreat from the slot first and then, as the coil is moved outward in the radial direction by the pressers, cause the plurality of second guide members to sequentially move outward in the central axis direction of the stator core and retreat from the slot in order with the second guide member on the radially inner side first.

(3) The stator assembly apparatus according to (1) or (2) above may include pushers (for example, connecting plates 613 and elastic members 614 described later) pushing the first guide members against the coil inward in the radial direction of the stator core.

(4) In the stator assembly apparatus according to any of (1) to (3) above, the at least one of the first guide members may be arranged such that, in a state of being inserted in the slot before the coil is inserted, at least a part of the at least one of the first guide members is in contact with opening ends (for example, opening ends 24a described later) of the insulating member in the slot.

(5) In the stator assembly apparatus according to any of (1) to (4) above, the first guide members and the second guide members may be arranged on each of both sides of the stator core in the central axis direction such that the first and second guide members on both sides face each other and arranged so that, when being inserted into the slots from both outsides of the stator core in the central axis direction, tips face each other in the slots.

(6) In the stator assembly apparatus according to any of (1) to (5) above, longitudinal widths (for example, longitudinal widths W11 and W21 described later) of the first guide members and the second guide members along the radial direction of the stator core may be substantially the same widths.

(7) In the stator assembly apparatus according to any of (1) to (6) above, lateral widths (for example, lateral widths W12 and W22 described later) of the first guide members and the second guide members along a circumferential direction of the stator core may be equal to or more than a width (for example, a width W0 described later) of the coil along the circumferential direction of the stator core.

(8) A stator assembly method according to the present invention is a stator assembly method for assembling a stator (for example, the stator 200 described later) by inserting a coil (for example, the belt-shaped coil 100 described later) into slots (for example, the slots 22 described later) of a stator core (for example, the stator core 2 described later) in which insulating members (for example, the pieces of insulating paper 24 described later) are mounted, from inside the stator core, the stator assembly apparatus including: inserting, before inserting the coil into the slots, at least one of first guide members (for example, the leading guide members 61 described later) into each one of the slots from outside in a central axis direction of the stator core such that the at least one of the first guide members is arranged inside the insulating member in the slot, and inserting a plurality of the second guide members (for example, the reinforcing guide members 62, the first reinforcing guide member 62a, the second reinforcing guide member 62b and the third reinforcing guide member 62c described later) into the one slot such that the plurality of second guide members are arranged inside the insulating member and on an outer side relative to the at least one of the first guide members in a radial direction in the slot; causing the coil to move toward the slot to cause the coil to come into contact with the at least one of the first guide members and causing the at least one of the first guide members to move outward in the radial direction in the slot, accompanying the movement of the coil; and, after the at least one of the first guide members moves outward in the radial direction in the slot until coming into contact with or close to a second guide member arranged on a radially inner side among the plurality of second guide members, causing the plurality of second guide members to sequentially move to an outer side of the stator core in the central axis direction in order with the second guide member closest to the at least one of the first guide members first and retreat from the slot as the coil is moved outward in the radial direction.

(9) A stator assembly method according to the present invention is a stator assembly method for assembling a stator (for example, the stator 200 described later) by inserting a coil (for example, the belt-shaped coil 100 described later) into slots (for example, the slots 22 described later) of a stator core (for example, the stator core 2 described later) in which insulating members (for example, the pieces of insulating paper 24 described later) are mounted, from inside the stator core, the stator assembly apparatus including: inserting, before inserting the coil into the slots, at least one of first guide members (for example, the leading guide members 61 described later) into each one of the slots from outside in a central axis direction of the stator core such that the at least one of the first guide members is arranged inside the insulating member in the slot, and inserting a plurality of the second guide members (for example, the reinforcing guide members 62, the first reinforcing guide member 62a, the second reinforcing guide member 62b and the third reinforcing guide member 62c described later) into the one slot such that the plurality of second guide members are arranged inside the insulating member and on an outer side relative to the at least one of the first guide members in a radial direction in the slot; causing the coil to move toward the slot to cause the coil to come into contact with the at least one of the first guide members and causing the at least one of the first guide members to move outward in the radial direction in the slot, accompanying the movement of the coil; and, after the at least one of the first guide members moves outward in the radial direction in the slot until coming into contact with or close to a second guide member arranged on a radially inner side among the plurality of second guide members, causing the at least one of the first guide members to move outward in the central axis direction of the stator core and retreat from the slot first and then, as the coil moves outward in the radial direction, causing the plurality of second guide members to sequentially move outward in the central axis direction of the stator core and retreat from the slot in order with the second guide member on the radially inner side first.

(10) In the stator assembly method according to (8) or (9) above, the first guide members may press the coil inward in the radial direction of the stator core while moving, being pushed by the coil.

(11) In the stator assembly method according to any of (8) to (10) above, in the process of inserting at least one of the first guide members and a plurality of second guide members into each one of the slots, the at least one of the first guide members may be inserted into the slot such that at least a part of the at least one of the first guide members is in contact with opening ends (for example, the opening ends 24*a* described later) of the insulating member in the slot.

(12) In the stator assembly method according to any of (8) to (11) above, the first guide members and the second guide members may be arranged on each of both sides of the stator core in the central axis direction such that the first and second guide members on both sides face each other; and, in the process of inserting at least one of the first guide members and a plurality of the second guide members into each one of the slots, at least one of the first guide members and a plurality of the second guide members may be inserted into each one of the slots from each of both outsides of the stator core in the central axis direction and are arranged such that tips face each other in the slot.

(13) In the stator assembly method according to any of (8) to (12) above, longitudinal widths (for example, the longitudinal widths W11 and W21 described later) of the first guide members and the second guide members along the radial direction of the stator core are substantially the same widths.

(14) In the stator assembly method according to any of (8) to (13) above, lateral widths (for example, the lateral widths W12 and W22 described later) of the first guide members and the second guide members along a circumferential direction of the stator core may be equal to or more than a width (for example, the width W0 described later) of the coil along the circumferential direction of the stator core.

According to (1) above, at the time of inserting the coil into the slots from inside the stator core, a first guide member and a plurality of second guide members support an insulating member mounted in each slot so as to open the insulating member; and, in the process of the first guide member moving in the slot being pressed by the coil, the plurality of second guide members sequentially retreat from inside the slot. Therefore, it is possible to keep the space in the slot equal to or smaller than a set thickness (the thickness of the guide members in the radial direction). It is possible thereby to insert the coil into the slots without catching or rolling the insulating members and improve buckling resistance of the insulating members. By changing the thickness of each guide member in the radial direction, it is possible to easily cope with the tension (rigidity) of the coil and change in the insertion load.

According to (2) above, at the time of inserting the coil into the slots from inside the stator core, a first guide member and a plurality of second guide members support an insulating member mounted in each slot so as to open the insulating member; and, in the process of the coil moving in the slot, the first guide member and the plurality of second guide members sequentially retreat from inside the slot in order with the guide member on the radially inner side first. Therefore, it is possible to keep the space in the slot equal to or smaller than a set thickness (the thickness of the guide members in the radial direction). It is possible thereby to insert the coil into the slots without catching or rolling the insulating members and improve buckling resistance of the insulating members. By changing the thickness of each guide member in the radial direction, it is possible to easily cope with the tension (rigidity) of the coil and change in the insertion load. Since the first guide member retreats from the slot first, the distance the first guide member moves in the radial direction scraping the insulating member can be reduced, and it is also possible to prevent the insulating member from coming into contact with the first guide member moving in the radial direction and being twisted.

According to (3) above, by the first guide members pushing the coil inward in the radial direction of the stator core, it is possible to prevent loosening of the coil on the front side in the movement direction.

According to (4) above, by the first guide member being arranged between the opening ends of the insulating member, it is possible to keep the opening ends of the insulating member in an opened state prior to insertion of the coil. Since the coil moving toward the slot and the insulating member are thereby prevented from coming into contact with each other, it is possible to smoothly introduce the coil into the inside of the insulating member.

According to (5) above, since the distances of movements of the first guide member and the plurality of second guide members to each slot are reduced, it is possible to miniaturize the apparatus and save space.

According to (6) above, since it is possible to, at the time of causing the plurality of second guide members to sequentially retreat from inside the slot, accompanying movement of the coil and the first guide member, keep the width of a gap in the slot along the radial direction equal to or smaller than a predetermined width, it is possible to enable the effect of supporting the insulating member by the first guide member and the plurality of second guide members so as to open the insulating member and the effect of improving the insertability of the coil.

According to (7) above, due to the state of the first guide member and the plurality of second guide members supporting the insulating member so as to open the insulating member, it is possible to more certainly prevent the coil moving toward the inside of the slot from catching the insulating member in the slot.

According to (8) above, at the time of inserting the coil into the slots from inside the stator core, a first guide member and a plurality of second guide members support an insulating member mounted in each slot so as to open the insulating member; and, in the process of the first guide member moving in the slot being pressed by the coil, the plurality of second members sequentially retreat from inside the slot. Therefore, it is possible to keep the space in the slot equal to or smaller than a set thickness (the thickness of the guide members in the radial direction). It is possible thereby to insert the coil into the slots without catching or rolling the insulating members and improve buckling resistance of the insulating members. By changing the thickness of each guide member in the radial direction, it is possible to easily cope with the tension (rigidity) of the coil and change in the insertion load.

According to (9) above, at the time of inserting the coil into the slots from inside the stator core, a first guide member and a plurality of second guide members support an insulating member mounted in each slot so as to open the insulating member; and, in the process of the coil moving in the slot, the first guide member and the plurality of second guide members sequentially retreat from inside the slot in order with the guide member on the radially inner side first.

Therefore, it is possible to keep the space in the slot equal to or smaller than a set thickness (the thickness of the guide members in the radial direction). It is possible thereby to insert the coil into the slots without catching or rolling the insulating members and improve buckling resistance of the insulating members. By changing the thickness of each guide member in the radial direction, it is possible to easily cope with the tension (rigidity) of the coil and change in the insertion load. Since the first guide member retreats from the slot first, the distance the first guide member moves in the radial direction scraping the insulating member can be reduced, and it is also possible to prevent the insulating member from coming into contact with the first guide member moving in the radial direction and being twisted.

According to (10) above, by the first guide members pushing the coil inward in the radial direction of the stator core while moving, being pushed by the coil that is moving toward the inside of the slot, it is possible to prevent loosening of the coil on the front side in the movement direction.

According to (11) above, by the first guide member being arranged between opening ends of the insulating member, it is possible to keep the opening ends of the insulating member in an opened state prior to insertion of the coil. Since the coil moving toward the slot and the insulating member are thereby prevented from coming into contact with each other, it is possible to smoothly introduce the coil into the inside of the insulating member.

According to (12) above, since the distances of movements of the first guide member and the plurality of second guide members to each slot are reduced, it is possible to miniaturize the apparatus and save space.

According to (13) above, since it is possible to, at the time of causing the plurality of second guide members to be sequentially retreated from inside the slot, accompanying movement of the coil and the first guide member, keep the width of a gap in the slot along the radial direction equal to or smaller than a predetermined width, it is possible to enable the effect of supporting the insulating member by the first guide member and the plurality of second guide members so as to open the insulating member and the effect of improving the insertability of the coil.

According to (14) above, due to the state of the first guide member and the plurality of second guide members supporting the insulating member so as to open the insulating member, it is possible to more certainly prevent the coil moving toward the inside of the slot from catching the insulating member in the slot.

DESCRIPTION OF THE DRAWINGS

FIG. 10G is a diagram illustrating the operation process of inserting the coil into the slots from inside the stator core;

FIG. 13H is a diagram showing the other embodiment in which the coil is inserted into the slot;

FIG. 13I is a diagram showing the other embodiment in which the coil is inserted into the slot; and FIG. 13J is a diagram showing the other embodiment in which the coil is inserted into the slot.

DETAILED DESCRIPTION OF THE INVENTION

Figure 1:
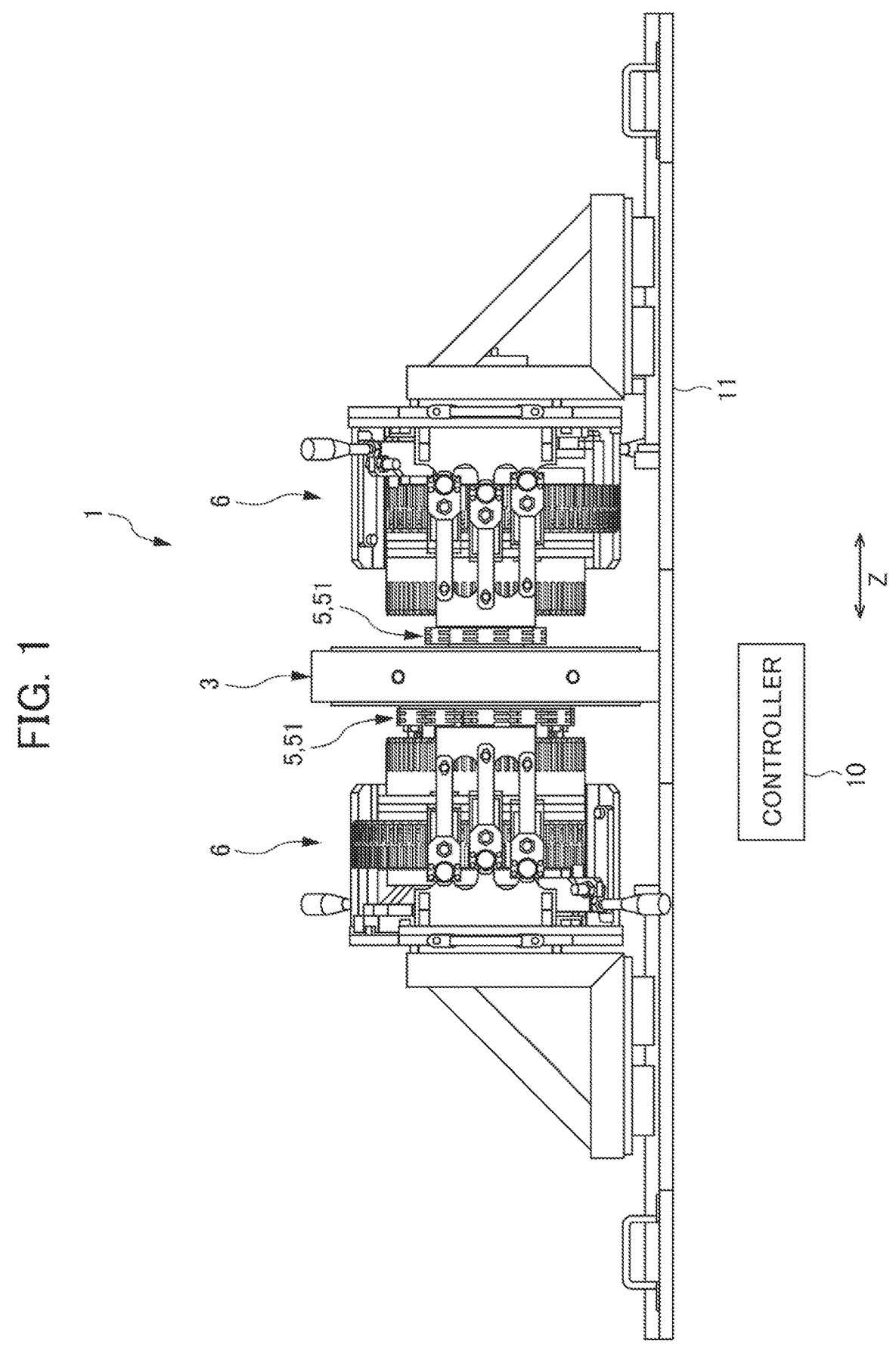
FIG. 1 is a side view showing the appearance of a stator assembly apparatus.
Figure 2:
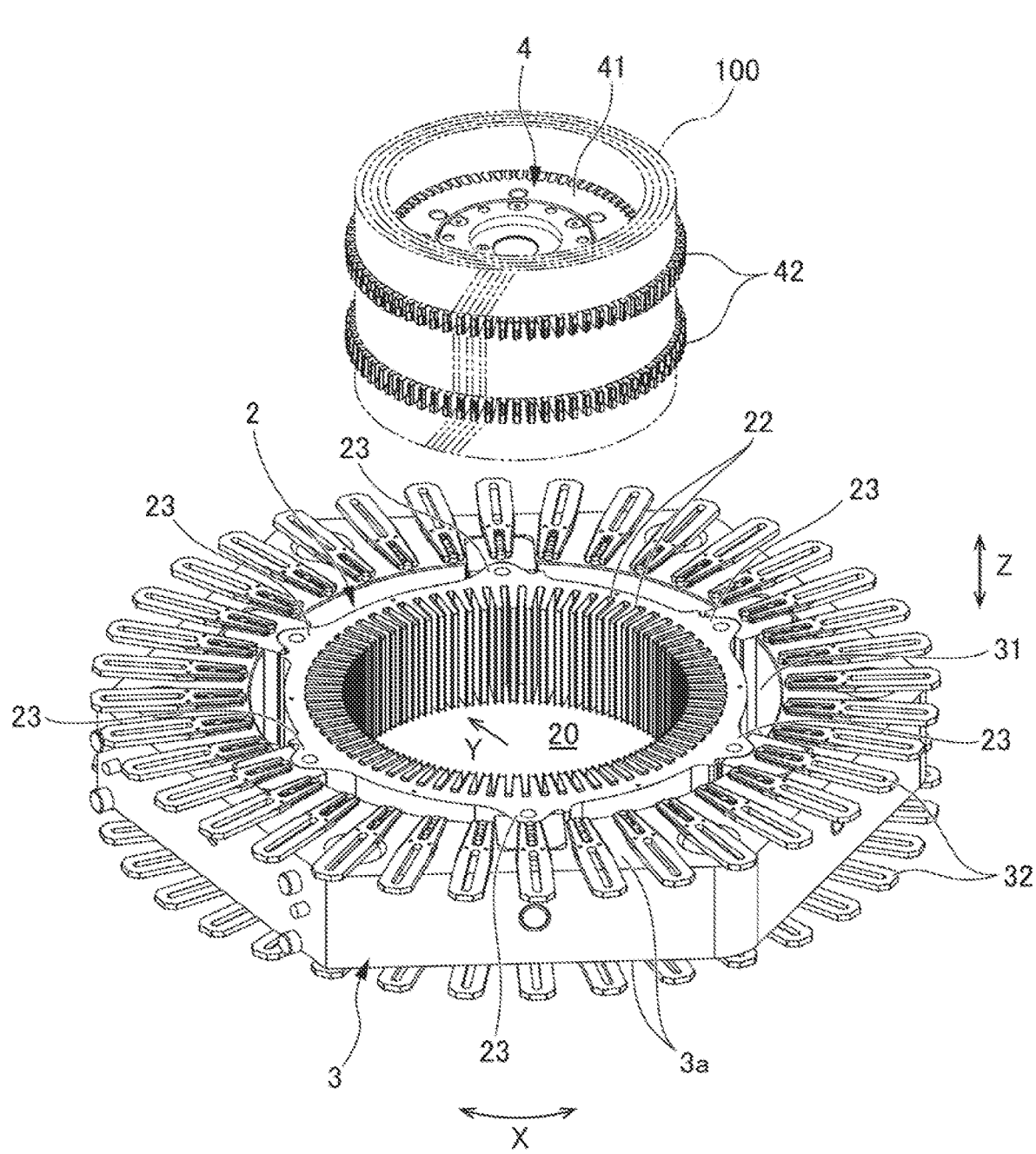
FIG. 2 is a perspective view showing a positioning jig and a coil winding jig in the stator assembly apparatus, the positioning jig and the coil winding jig being disassembled.

An embodiment of the present invention will be described below in detail with reference to drawings. As shown in FIGS. 1 and 2, a stator assembly apparatus 1 is provided with a stator core 2, a positioning jig 3 that positions and fixes the stator core 2, a coil winding jig 4 around which a belt-shaped coil 100 is annularly wound, coil expansion mechanism units 5 that expand the belt-shaped coil 100 wound around the coil winding jig 4, and guide mechanism units 6 that guide insertion of the belt-shaped coil 100 into slots 22 of the stator core 2.

The stator core 2 has an annular portion 21 configured, for example, with a laminate in which a plurality of thin core plates are laminated. In the center of the annular portion 21, there is a through-hole 20 penetrating the annular portion 21 in the axial direction. The stator core 2 has a plurality of slots 22 penetrating the stator core 2 in the axial direction. The slots 22 are radially arranged at regular intervals along the circumferential direction of the annular portion 21, and have opening portions 22a that are open to the through-hole 20 inside the annular portion 21 in the radial direction. The stator core 2 of the present embodiment has seventy-two slots 22. On the outer periphery of the annular portion 21 of the stator core 2, there are six tab portions 23 protruding at regular intervals.

In the stator core 2 and the positioning jig 3, an X direction in which the slots 22 are arranged is the circumferential direction as shown in FIG. 2. A Y direction along a radial direction from the center the through-hole 20 is the radial direction. A Z direction orthogonal to the X and Y directions and along the central axis of the through-hole 20 of the stator core 2 is the central axis direction.

As shown in FIGS. 1 and 2, the positioning jig 3 is formed in a hexagonal cylinder shape having a dimension in the central axial direction substantially equal to the dimension of the stator core 2 in the central axial direction, and has, at the center thereof, a stator core insertion hole 31 in which the stator core 2 can be inserted and arranged. The positioning jig 3 fixes the stator core 2 at a predetermined position and in a predetermined posture in the stator core insertion hole 31 by supporting each of the six tab portions 23 of the stator core 2. In the stator assembly apparatus 1 of the present embodiment, the positioning jig 3 is fixed to a center portion of a base 11 of the stator assembly apparatus 1 such that the central axis direction of the stator core 2 fixed in the stator core insertion hole 31 is a horizontal direction.

Figure 3:
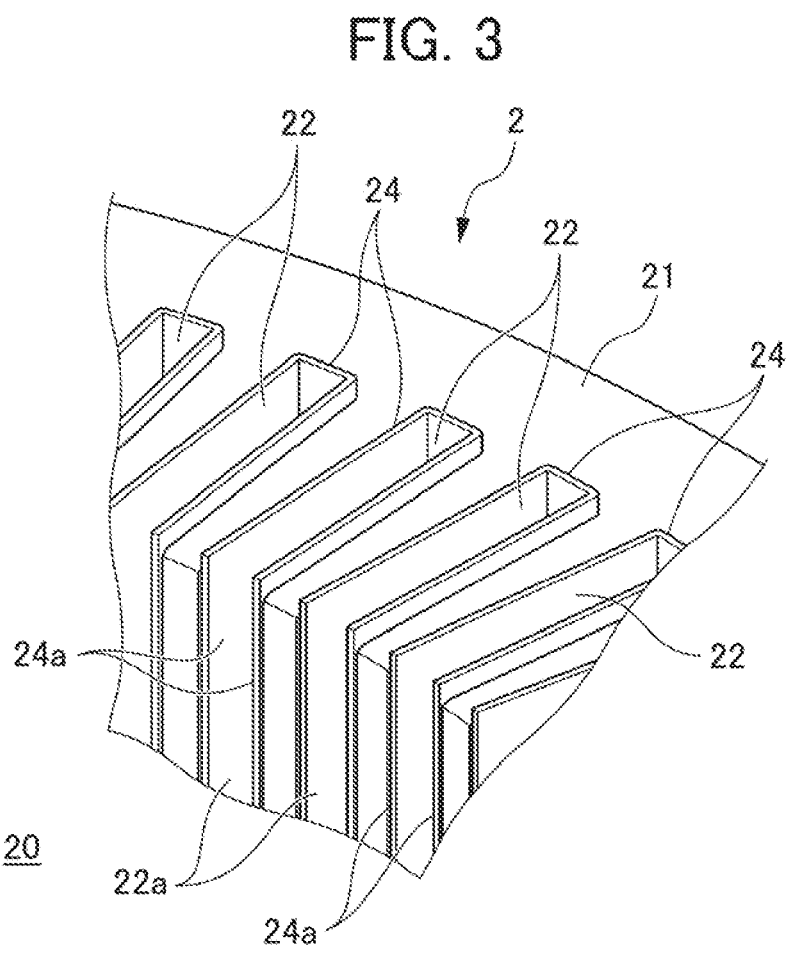
FIG. 3 is a perspective view showing insulating members mounted in slots of a stator core.

As shown in FIG. 3, pieces of insulating paper 24, which are insulating members, are mounted in the slots 22 of the stator core 2, respectively, in advance. Each piece of insulating paper 24 is formed by being folded in a substantially U-shape so as to follow the substantially U-shaped inner surface of each slot 22 when the stator core 2 is viewed in the axial direction. The pieces of insulating paper 24 are open to the through-hole 20 inside the stator core 2 in the radial direction. Opening ends 24a of the pieces of insulating paper 24 are arranged at opening portions 22a of the slots 22 and open the insides of the pieces of insulating paper 24 to the through-hole 20.

As shown in FIG. 2, a plurality of cuff guides 32 formed in elongated thin plate shapes are radially arranged on both end faces 3a of the positioning jig 3 in the central axis direction, at regular intervals along the circumferential direction. At the time of inserting the belt-shaped coil 100 described later into the slots 22 of the stator core 2, the cuff guides 32 support the pieces of insulating paper 24 protruding from both end faces of the stator core 2 in the central axis direction and guide movement of the belt-shaped coil 100 into the slots 22. The cuff guides 32 are provided so as to be movable back and forth along the radial direction of the stator core 2 by driving of an actuator such as a cylinder not shown.

The coil winding jig 4 has a jig main body 41 in a substantially cylindrical shape and a plurality of comb tooth portions 42 radially protruding from the outer periphery of the jig main body 41. The comb tooth portions 42 are provided on both end portions of the jig main body 41 in the central axial direction. The number of comb tooth portions 42 arranged in the circumferential direction of the jig main body 41 matches the number of slots 22 provided in the stator core 2. In order that the coil winding jig 4 can be inserted in the through-hole 20 of the stator core 2, the coil winding jig 4 is formed such that the outer diameter of the coil winding jig 4 defined by the positions of the tips of the comb tooth portions 42 is equal to or smaller than the hole diameter of the through-hole 20 of the stator core 2.

Figure 4:
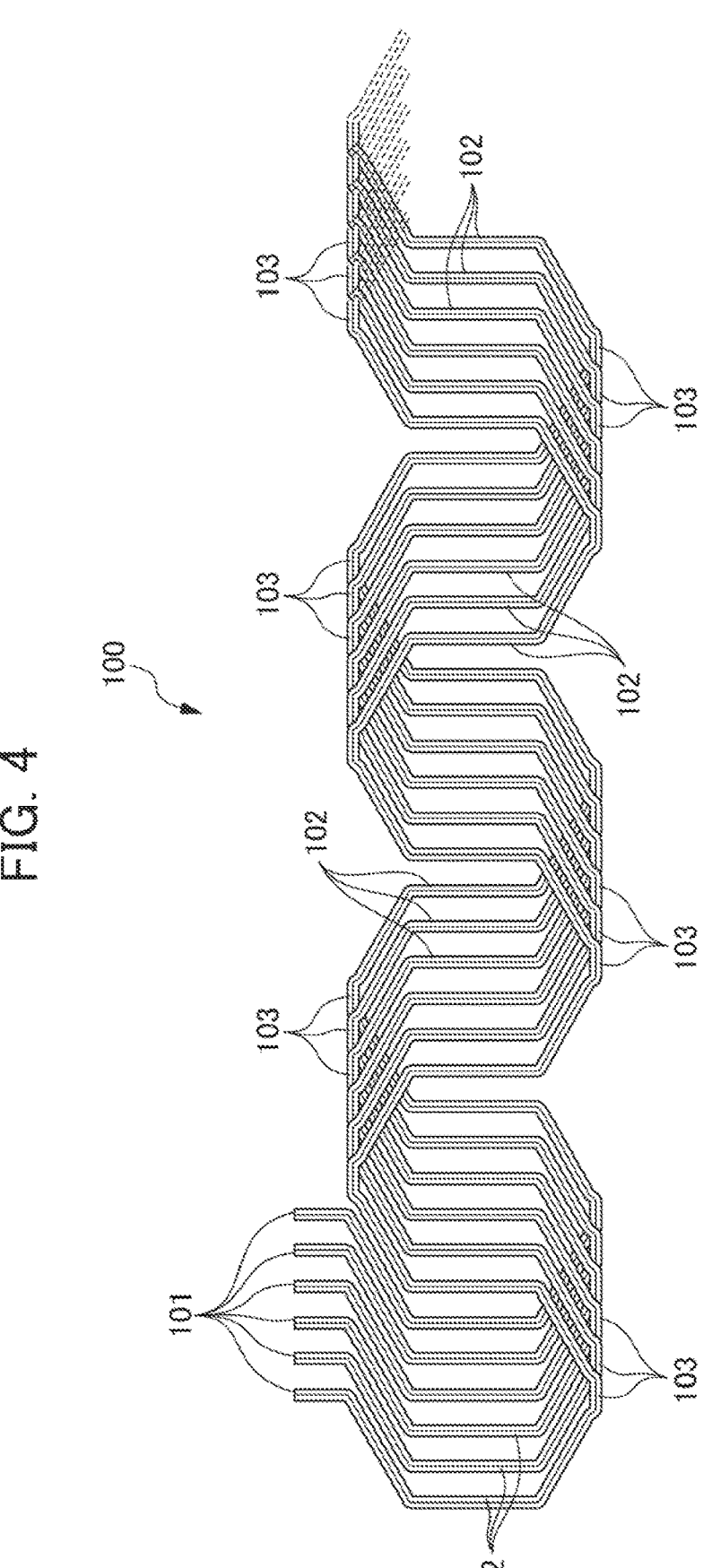
FIG. 4 is a development view showing an example of a coil.

The belt-shaped coil 100 to be mounted in the stator core 2 is annularly wound over the plurality of comb tooth portions 42. As shown in FIG. 4, the belt-shaped coil 100 is configured with an elongated belt-shaped continuous wave-wound coil formed by flat type conducting wires 101 each of which has a substantially rectangular section. At the time of setting a coil into slots of a stator core, the continuous wave-wound coil does not require the technology of molding a coil divided in a plurality of segments and welding coil ends after insertion into the slots, which is a technology mainly adopted in the world. Therefore, the necessity of using, for example, high-purity copper material for the coil in order to cope with thermal processing of welding points is eliminated. Therefore, it becomes possible to use recycled copper material that includes impurities, and it is possible to contribute to realization of reuse of resources. Moreover, since the wave-wound coil does not require welding, it is possible to reduce the weight of the coil and reduce the weight of a rotary electric machine using the coil. When the rotary electric machine is mounted on a hybrid car, it is possible to, by the vehicle weight being reduced, reduce carbon dioxide and reduce the harmful effect on the global environment.

The belt-shaped coil 100 has a plurality of straight portions 102 and a plurality of coil end portions 103. The straight portions 102 are parts to be inserted into the slots 22 of the stator core 2, and the straight portions 102 extend substantially linearly and are arranged in parallel at regular intervals. The coil end portions 103 are arranged at positions nearer to the side ends of the belt-shaped coil 100 than the straight portions 102, and alternately connect end portions on one side of adjacent straight portions 102 and end portions on the other side of adjacent straight portions 102 in substantially triangular chevron shapes along the length direction of the belt-shaped coil 100. The coil end portions 103 are parts that protrude from the slots 22 in the axial direction of the stator core 2 when the belt-shaped coil 100 is mounted in the slots 22 of the stator core 2, and are pressed by the coil expansion mechanism units 5 described later when the belt-shaped coil 100 is inserted into the slots 22. The belt-shaped coil 100 of the present embodiment is formed in an elongated belt shape by bundling six flat type conducting wires 101 with the plurality of straight portions 102 and the plurality of coil end portions 103 foldedly formed, such that the straight portions 102 are arranged side by side in parallel at regular intervals.

The coil winding jig 4 winds the belt-shaped coil 100 in many layers by sequentially inserting each of the straight portions 102 of the belt-shaped coil 100 between comb tooth portions 42 from outward before being inserted into the through-hole 20 of the stator core 2. As a result, as shown in FIG. 2, the coil winding jig 4 around which the belt-shaped coil 100 is wound in an annular shape is configured.

Figure 5:
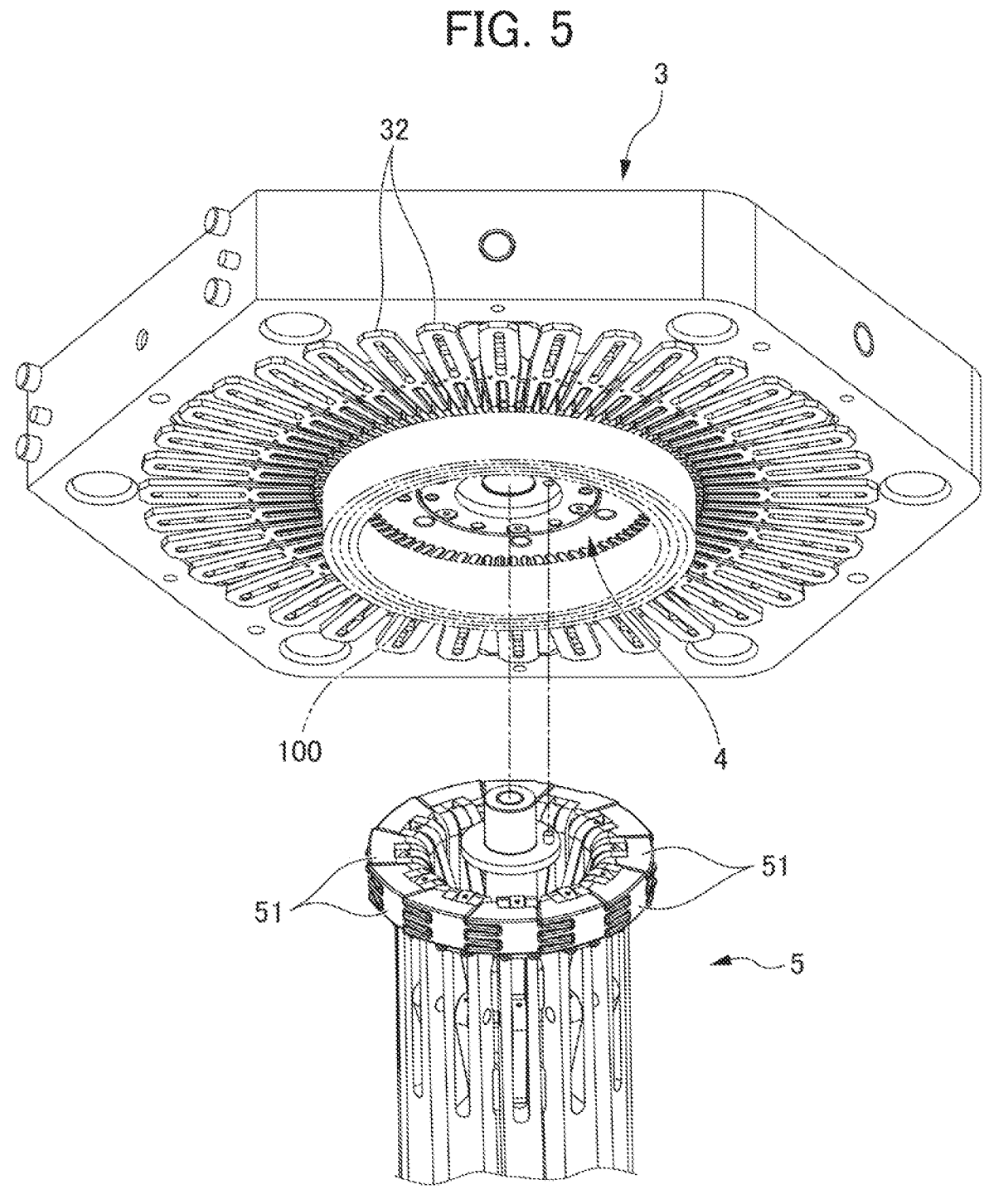
FIG. 5 is a perspective view showing that a coil expansion device is mounted in the coil winding jig mounted inside the stator core.

The coil winding jig 4 inserted in the through-hole 20 inside the stator core 2 is held at a predetermined position and in a predetermined posture by being supported by the paired coil expansion mechanism units 5 arranged to face both sides of the stator core 2 in the central axis direction with the positioning jig 3 therebetween. Each of the coil expansion mechanism units 5 of the present embodiment has a substantially cylindrical appearance shape as shown in FIG. 5, and is arranged to face the coil winding jig 4 inserted inside the stator core 2, in the central axis direction of the coil winding jig 4 as shown in FIG. 1. Each of the coil expansion mechanism units 5 is provided so as to be linearly movable on the base 11 and movable in directions of coming into contact with and being separated from the coil winding jig 4 by an actuator not shown.

Each of the coil expansion mechanism units 5 is formed in a substantially cylindrical shape and has a plurality of coil pressers 51 on the outer periphery on the tip side. The plurality of coil pressers 51 are arranged along the outer periphery of the coil expansion mechanism unit 5 on the tip side and provided so as to be expanded and reduced in diameter along the radial direction by driving of an actuator not shown. The outer diameter of the coil pressers 51 in a diameter-reduced state is equal to or smaller than the inner diameter of the annular belt-shaped coil 100 wound around the coil winding jig 4. The outer diameter of the coil pressers 51 in a diameter-expanded state is larger than the outer diameter of the coil winding jig 4. The coil expansion mechanism unit 5 holds the coil winding jig 4 by inserting the coil pressers 51 in the diameter-reduced state inside the annular belt-shaped coil 100 wound around the coil winding jig 4. When the coil pressers 51 inserted in the belt-shaped coil 100 are expanded in diameter, the belt-shaped coil 100 is pressed outward and expanded in diameter. As a result, the straight portions 102 of the belt-shaped coil 100 move toward the insides of the pieces of insulating paper 24 in the slots 22 arranged outside in the radial direction and inserted into the slots 22. The coil pressers 51 of the coil expansion mechanism unit 5 constitute pressers that press the belt-shaped coil 100 outward in the radial direction and cause the straight portions 102 of the belt-shaped coil 100 to move into the insides of the pieces of insulating paper 24 in the slots 22.

As shown in FIG. 1, the paired guide mechanism units 6 are arranged to face both sides of the stator core 2 in the central axis direction with the positioning jig 3 therebetween, similarly to the coil expansion mechanism units 5. The paired guide mechanism units 6 are arranged outside the coil expansion mechanism units 5 in the central axis direction, respectively, the guide mechanism units 6 and the coil expansion mechanism unit 5 being concentric with one another.

Figure 6:
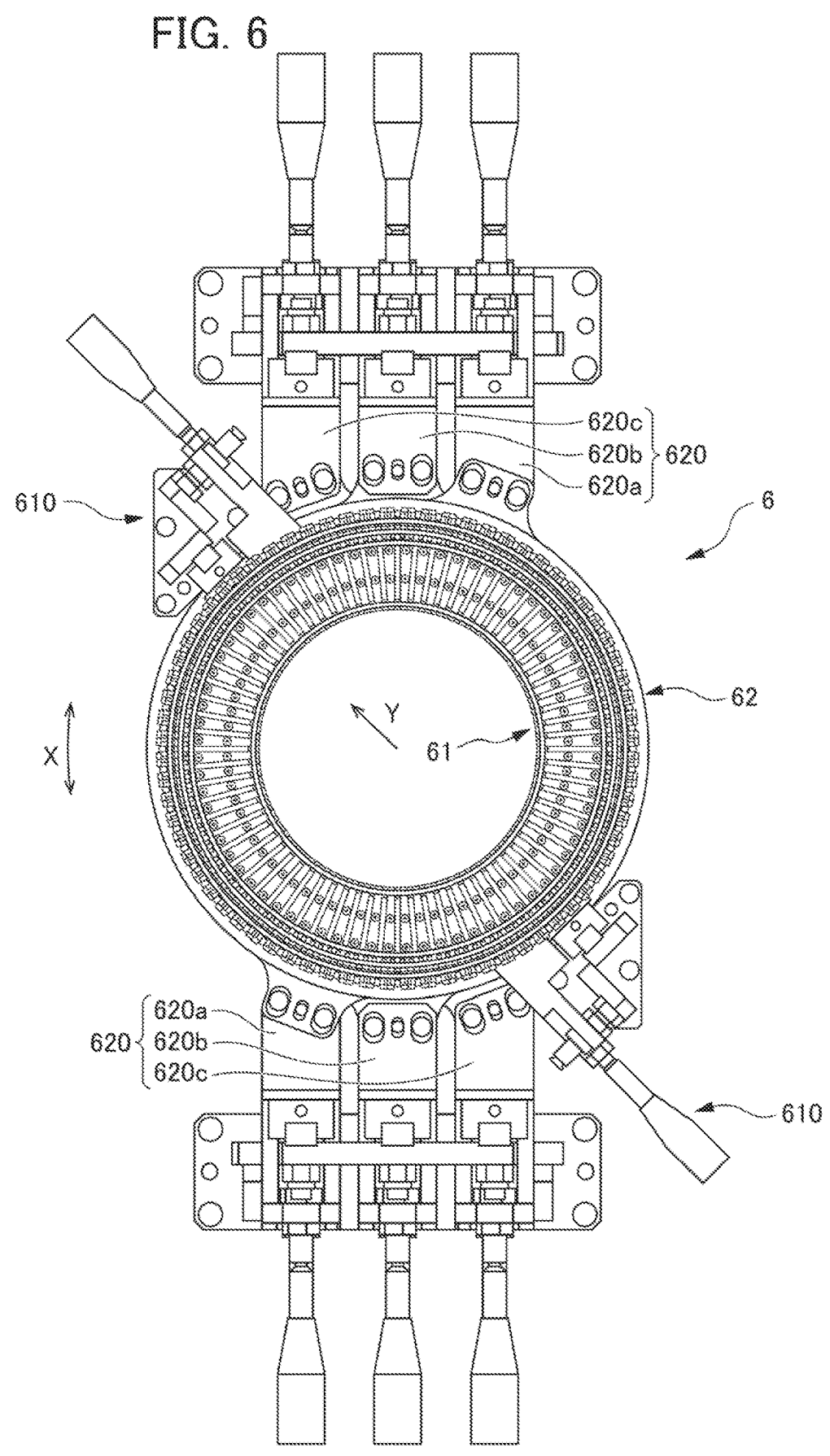
FIG. 6 is a diagram of a guide mechanism in the stator assembly apparatus viewed in the central axis direction.

Since the paired guide mechanism units 6 are in the same configuration, the configuration of one guide mechanism unit 6 will be described with reference to FIGS. 6 to 8. FIG. 6 is a diagram of one guide mechanism unit 6 viewed in a direction along the central axis direction of the stator core 2. The guide mechanism unit 6 has a plurality of leading guide members 61 that are annually arranged, and a plurality of reinforcing guide members 62 that are annually arranged on the outer side of the leading guide members 61. The leading guide members 61 correspond to first guide members, and the reinforcing guide members 62 correspond to second guide members.

Each of the leading guide members 61 is configured with a rod-shaped body with a length enough for the leading guide member 61 to be inserted inside the piece of insulating paper 24 mounted inside the slot 22. The section orthogonal to the longitudinal direction of the leading guide member 61 has a quadrilateral shape with rounded corners except for a tapered tip portion. A longitudinal width W11 (see FIG. 11A) of the leading guide member 61 along the radial direction of the stator core 2 is sufficiently smaller than the depth of the slot 22 along the radial direction of the stator core 2. The longitudinal width W11 of the leading guide members 61 of the present embodiment is set to approximately ⅕ of the depth of the slots 22. A lateral width W12 (see FIG. 11A) of the leading guide members 61 along the circumferential direction of the stator core 2 is equal to or smaller than the width inside the pieces of insulating paper 24 in the slots 22 along the circumferential direction of the stator core 2. The lateral width W12 of the leading guide members 61 is larger than a width W0 (see FIG. 11A) of the straight portions 102 of the belt-shaped coil 100 inserted into the slots 22 along the circumferential direction of the stator core 2.

At least one leading guide member 61 is provided for one slot 22, and the leading guide members 61 are annularly arranged with the same arrangement pitch as the arrangement pitch of the slots 22. Though one leading guide member 61 is provided for one slot 22 in the present embodiment, a plurality of leading guide members 61 may be provided for one slot 22.

Figure 7:
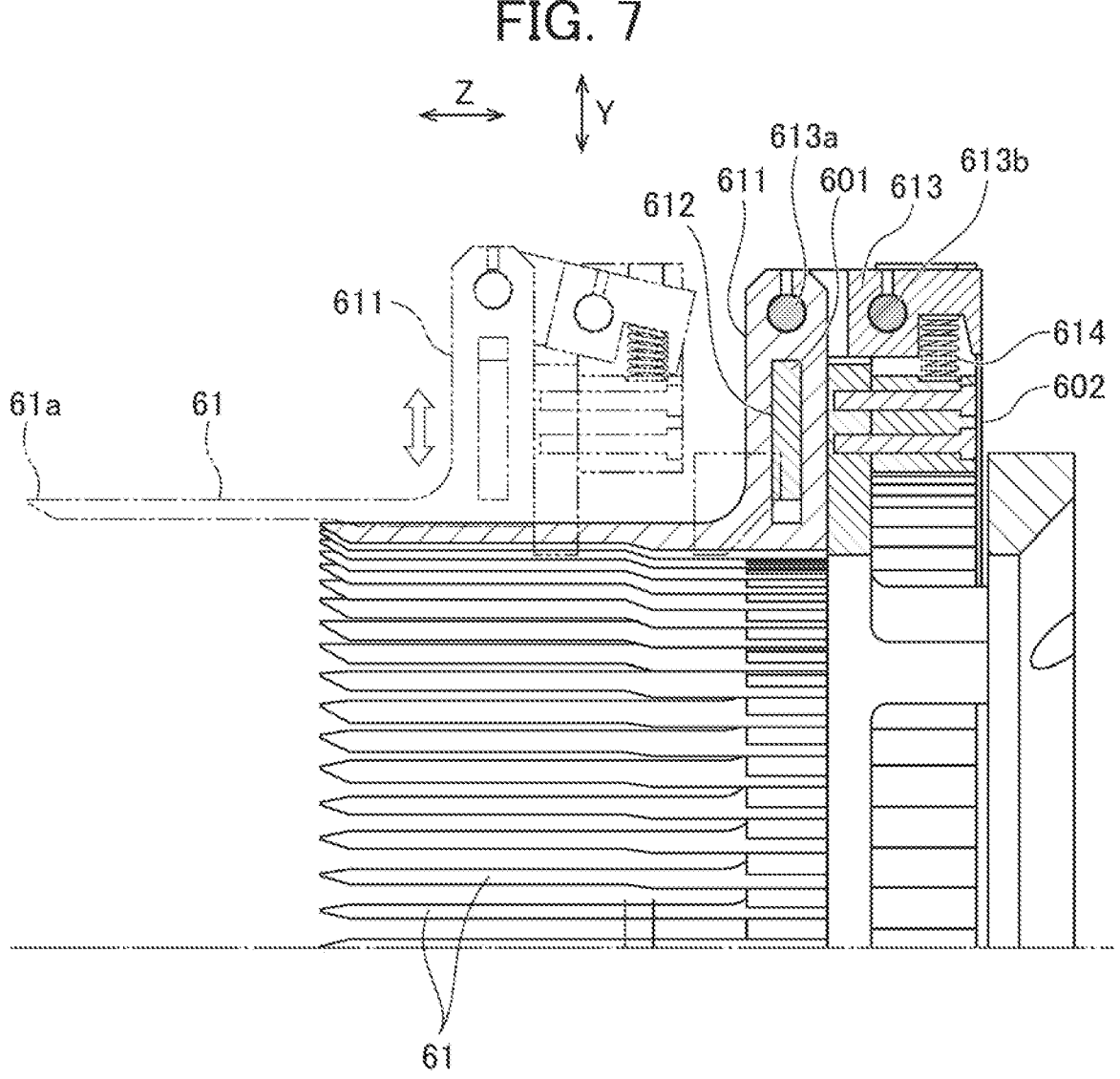
FIG. 7 is a sectional view showing first guide members in the guide mechanism.

As shown in FIG. 7, operation portions 611 are annularly formed on the base end sides of the leading guide members 61, respectively, the operation portions 611 protruding outward in the radial direction. In each of the operation portion 611, a guide hole 612 elongatedly extending outward in the radial direction is provided. In the guide hole 612, a support plate portion 601 provided in the guide mechanism unit 6 is fitted slidably in the radial direction (in the vertical direction in FIG. 7). Each leading guide member 61 is thereby supported by the guide mechanism unit 6 movably in the radial direction.

On the tip end side of the operation portion 611, one end of a connecting plate 613 is rotatably attached by a rotating shaft 613*a*. The other end of the connecting plate 613 extends in a direction opposite to the direction of extension of the leading guide member 61 relative to the operation portion 611 (the right direction in FIG. 7) and rotatably attached to a leading guide supporting portion 602 of the guide mechanism unit 6 by a rotating shaft 613*b*. On the other end side of the connecting plate 613 on the opposite side of the operation portion 611 relative to the rotating shaft 613*b*, an elastic member 614 configured with a coil spring or the like is provided, the elastic member 614 energizing the other end side of the connecting plate 613 outward in the radial direction.

By the elastic member 614 energizing the other end side of the connecting plate 613 outward in the radial direction, the leading guide member 61 is pushed by the connecting plate 613 and is always pushed inward in the radial direction. However, when a pressing force exceeding the energizing force of the elastic member 614 acts on the leading guide member 61 outward from inside in the radial direction, the leading guide member 61 can move outward in the radial direction to expand in diameter, along a white arrow in FIG. 7. When the pressing force is released, the leading guide member 61 is reduced in diameter inward in the radial direction by the energizing force of the elastic member 614 acting thereon, and returns to a steady state.

The plurality of leading guide members 61 are provided so as to be movable in the central axis direction of the stator core 2 by driving of an actuator 610 for driving leading guide members, which is provided in the guide mechanism unit 6. The actuator 610 is controlled by a controller 10 of the stator assembly apparatus 1 shown in FIG. 1. When being driven, the actuator 610 causes the leading guide supporting portion 602 to move in a direction toward the stator core 2 and in a direction away from the stator core 2, along the central axis direction of the stator core 2. By the leading guide supporting portion 602 moving in the direction toward the stator core 2, the plurality of leading guide members 61 are inserted inside the pieces of insulating paper 24 in their corresponding slots 22, respectively, in the central axis direction of the stator core 2. By the leading guide supporting portion 602 moving in the direction away from the stator core 2, the plurality of leading guide members 61 are withdrawn outside in the central axis direction of the stator core 2 from inside the pieces of insulating paper 24.

Each reinforcing guide member 62 is configured with a rod-shaped body with such a length that the reinforcing guide member 62 can be inserted inside the piece of insulating paper 24 mounted inside the slot 22, the length being shorter than the length of the leading guide member 61. The section orthogonal to the longitudinal direction of the reinforcing guide member 62 has a quadrilateral shape with rounded corners except for a tapered tip portion. A longitudinal width W21 (see FIG. 11A) of the reinforcing guide member 62 along the radial direction of the stator core 2 is substantially the same as the longitudinal width W11 of the leading guide members 61. A lateral width W22 (see FIG. 11A) of the reinforcing guide member 62 along the circumferential direction of the stator core 2 is substantially the same as the lateral width W12 of the leading guide members 61.

Three reinforcing guide members 62 are provided for one slot 22. That is, the three reinforcing guide members 62 include a first reinforcing guide member 62a on the radially innermost side, a second reinforcing guide member 62b arranged on the outer side of the first reinforcing guide member 62a, and a third reinforcing guide member 62c arranged on the outer side of the second reinforcing guide member 62b in the radial direction. The first reinforcing guide member 62a, the second reinforcing guide member 62b, and the third reinforcing guide member 62c are annularly arranged, with the same arrangement pitch as the arrangement pitch of the slots 22 and stacked in the radial direction. However, the first reinforcing guide member 62a on the radially innermost side, among the three reinforcing guide members 62, and the leading guide member 61 are separated from each other by a distance L corresponding to each of the longitudinal width W11 of one leading guide member 61 and the longitudinal width W21 of each of one first reinforcing guide member 62a, one second reinforcing guide member 62b, and one third reinforcing guide member 62c (see FIGS. 9 and 11A). The specific distance L is to be appropriately set according to the specifications of the slots 22, the type of the insulating paper 24, and the like and is not especially limited. In the present embodiment, the distance L is set to 4.2 mm.

Figure 8:
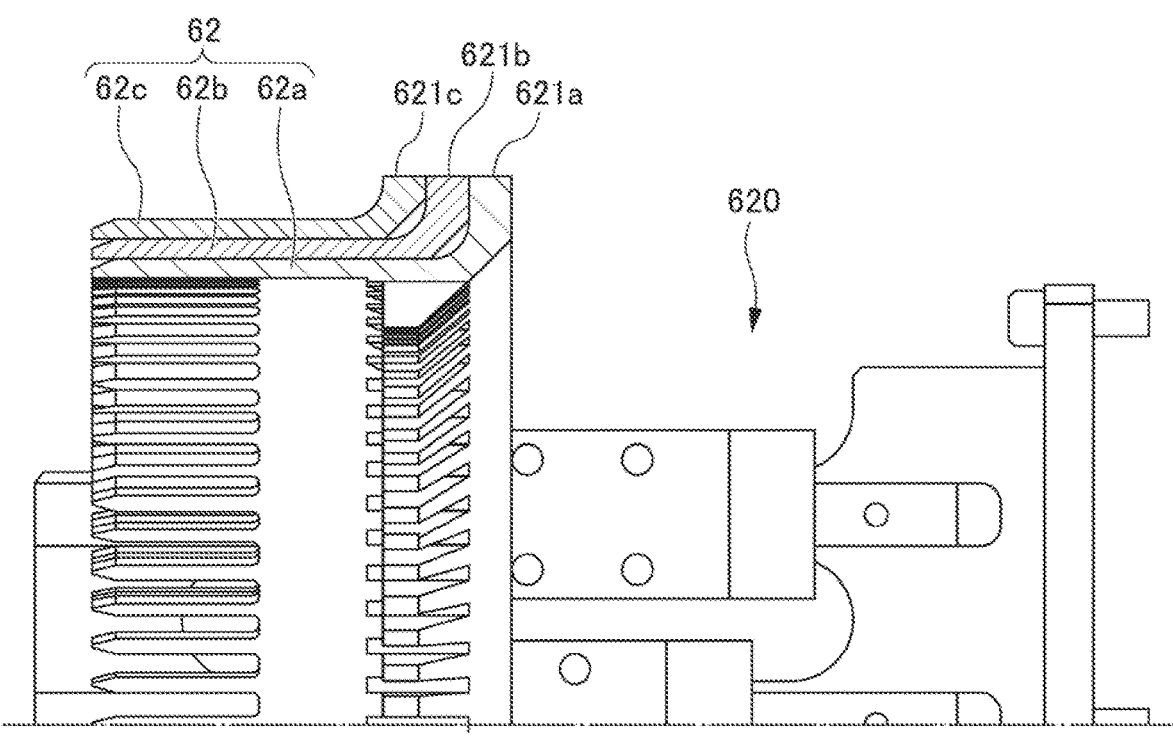
FIG. 8 is a sectional view showing second guide members in the guide mechanism.

As shown in FIG. 8, the tips of the first reinforcing guide member 62a, the second reinforcing guide member 62b, and the third reinforcing guide member 62c are formed being tapered. On the base sides of the first reinforcing guide member 62a, the second reinforcing guide member 62b, and the third reinforcing guide member 62c, operation portions 621a, 621b and 621c protruding outward in the radial direction are annularly formed, respectively. The operation portions 621a, 621b, and 621c are individually coupled with actuators 620 of the guide mechanism unit 6, respectively.

The first reinforcing guide members 62a, the second reinforcing guide members 62b, and the third reinforcing guide members 62c are provided so as to be individually movable in the central axis direction of the stator core 2 by driving of the actuators 620 for driving reinforcing guide members, which are provided in the guide mechanism unit 6. The actuators 620 include a first reinforcing guide actuator 620a, a second reinforcing guide actuator 620b, and a third reinforcing guide actuator 620c, which are individually controlled by the controller 10 of the stator assembly apparatus 1 shown in FIG. 1.

When being driven, the actuators 620 cause the first reinforcing guide members 62a, the second reinforcing guide members 62b, and the third reinforcing guide members 62c to individually move in the direction toward the stator core 2 and in the direction away from the stator core 2, along the central axis direction of the stator core 2. By moving in the direction toward the stator core 2, the first reinforcing guide members 62a, the second reinforcing guide members 62b, and the third reinforcing guide members 62c are inserted inside the pieces of insulating paper 24 in their corresponding slots 22, respectively, in the central axis direction of the stator core 2. By moving in the direction away from the stator core 2, the first reinforcing guide members 62a, the second reinforcing guide members 62b, and the third reinforcing guide members 62c can be individually withdrawn outside in the central axis direction of the stator core 2 from inside the pieces of insulating paper 24 in the slots 22, respectively.

Next, description will be made on a process of inserting the straight portions 102 of the belt-shaped coil 100 inside the pieces of insulating paper 24 in the slots 22 of the stator core 2 in the stator assembly apparatus 1. FIG. 9 and FIGS. 10A to 10J schematically show an operation process of inserting the belt-shaped coil 100 wound around the coil winding jig 4 inside the pieces of insulating paper 24 in the slots 22 of the stator core 2 from inside the stator core 2. Since the operation processes on both sides of the stator core 2 in the central axis direction progress in synchronization with each other, FIGS. 10A to 10J show only the operation process on one side of the stator core 2 in the central axis direction. FIGS. 11A to 11J schematically show the leading guide member 61 and the reinforcing guide members 62 in one slot 22 of the stator core 2. FIGS. 11A to 11J temporally correspond to FIGS. 10A to 10J. In FIG. 9, FIGS. 10A to 10J, and FOGS. 11A to 11J, the positioning jig 3 is not shown.

Figure 9:
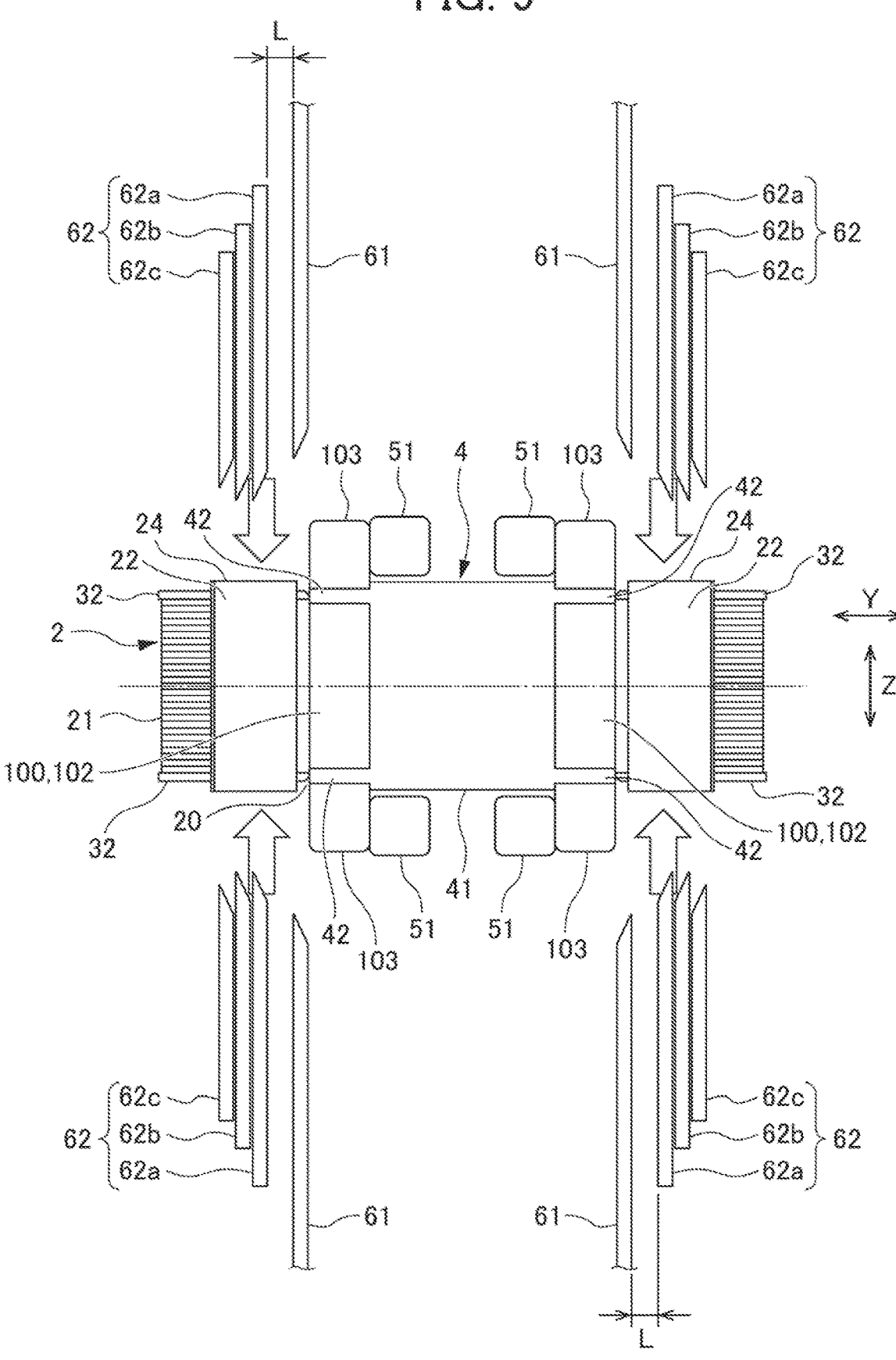
FIG. 9 is a perspective view showing that the first guide members and the second guide members are inserted into the slots of the stator core.

First, as shown in FIG. 9, after the coil winding jig 4 around which the belt-shaped coil 100 is wound is supported in the through-hole 20 of the stator core 2 by the coil expansion mechanism units 5, the actuators 610 and 620 of the guide mechanism unit 6 are drive-controlled by the controller 10 to insert all the leading guide members 61 and the reinforcing guide members 62 inside the pieces of insulating paper 24 in the slots 22, respectively, from both outer sides of the stator core 2 in the central axis direction. The tips of the leading guide members 61, and the tips of the reinforcing guide members 62 inserted inside the piece of insulating paper 24 in each slot 22 are arranged to face each other in the slot 22.

Figure 10A:
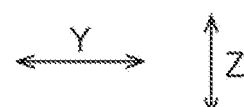
FIG. 10A is a diagram illustrating an operation process of inserting the coil into the slots from inside the stator core.
Figure 10A:
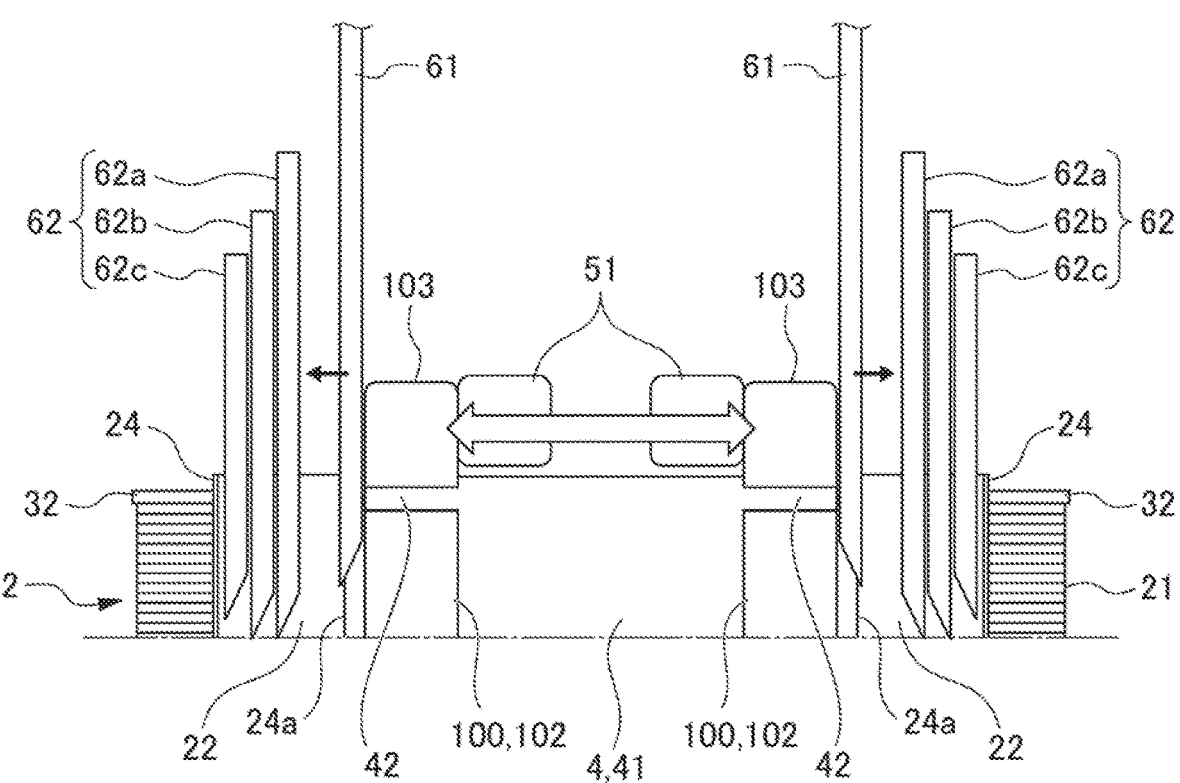
Figure 11A:
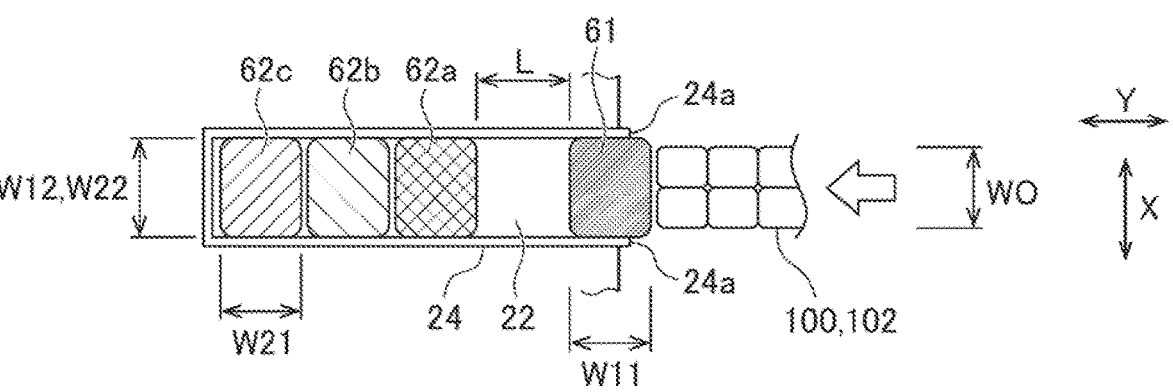
FIG. 11A is a diagram showing that the coil is inserted into each slot.

In a state immediately after all the leading guide members 61 and the reinforcing guide members 62 are inserted inside the pieces of insulating paper 24 in the slots 22, each leading guide member 61 is arranged in the slot 22 in a state of at least a part thereof being in contact with the opening ends 24a as shown in FIGS. 10A and 11A. That is, the leading guide member 61 is arranged between the paired opening ends 24a of the piece of insulating paper 24. The first reinforcing guide member 62a, the second reinforcing guide member 62b, and the third reinforcing guide member 62c, which are the reinforcing guide members 62, are arranged in a state of being stacked on the outer side in the slot 22 (on the depth side of the slot 22) in the radial direction. The leading guide member 61 and the first reinforcing guide member 62a on the radially innermost side are separated from each other by the distance L.

The state in which the leading guide member 61 and the reinforcing guide members 62 are inserted inside the piece of insulating paper 24 in the slot 22 is close to a state in which the straight portions 102 of the belt-shaped coil 100 are inserted inside the piece of insulating paper 24. Therefore, the piece of insulating paper 24 before the straight portions 102 of the belt-shaped coil 100 are inserted therein is in a state of the piece of insulating paper 24 after the straight portions 102 of the belt-shaped coil 100 are inserted, and the shape of the piece of insulating paper 24 is held in a proper shape prior to insertion of the belt-shaped coil 100. Moreover, since at least a part of the leading guide member 61 is arranged in each slot 22 in the state of being in contact with the opening ends 24a of the piece of insulating paper 24, it is possible to hold the opening ends 24a of the piece of insulating paper 24 in an opened state prior to insertion of the belt-shaped coil 100. As a result, the piece of insulating paper 24 is prevented from coming into contact with the belt-shaped coil 100 that is moving. Therefore, it is possible to smoothly introduce the belt-shaped coil 100 inside the pieces of insulating paper 24.

After insertion of the leading guide members 61 and the reinforcing guide members 62 is completed, the controller 10 causes the coil expansion mechanism unit 5 to operate to expand the coil presser 51 in diameter in the direction of a white arrow shown in FIG. 10A. The coil end portions 103 of the belt-shaped coil 100 wound around the coil winding jig 4 is thereby pressed by the coil presser 51 expanding in diameter and move outward in the radial direction of the stator core 2. The belt-shaped coil 100 gradually expands in diameter, accompanying the movement, and the straight portions 102 gradually move toward the inside of the piece of insulating paper 24 in each slot 22 (FIGS. 10A and 11A).

Figure 10B:
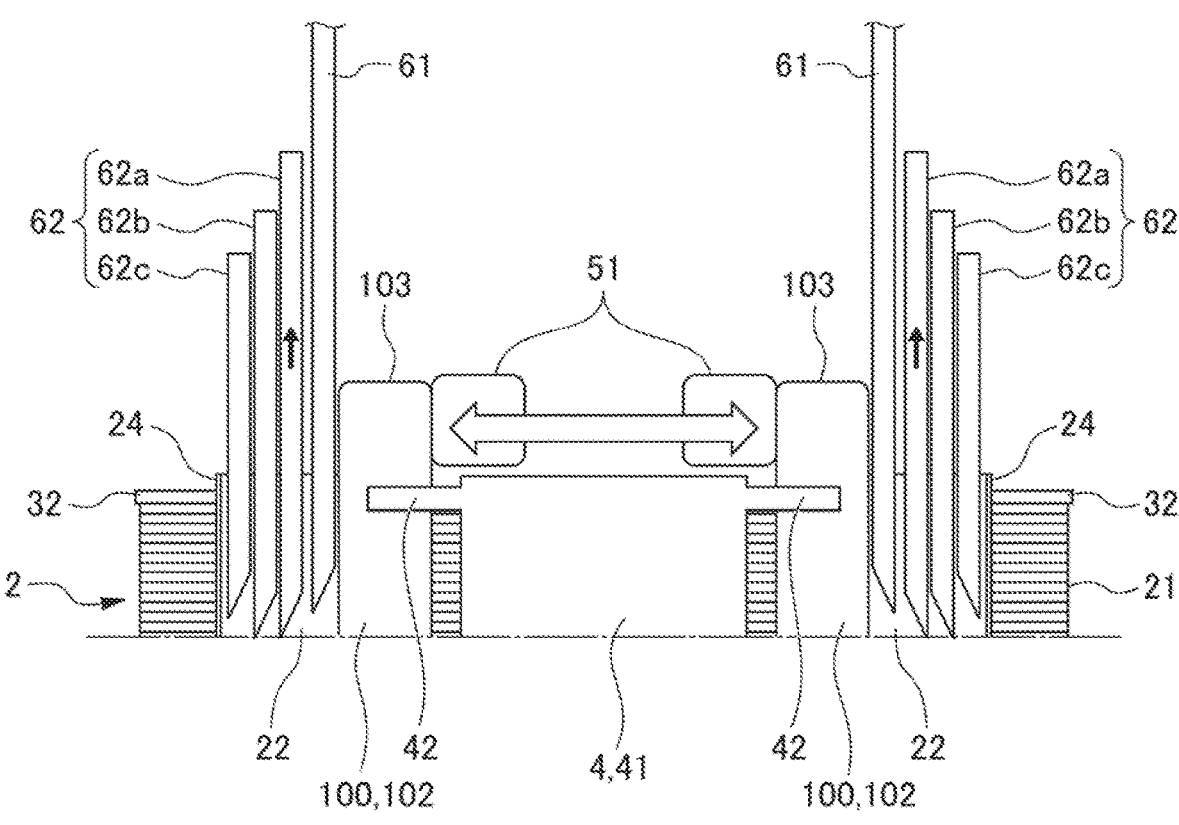
FIG. 10B is a diagram illustrating the operation process of inserting the coil into the slots from inside the stator core.
Figure 11B:
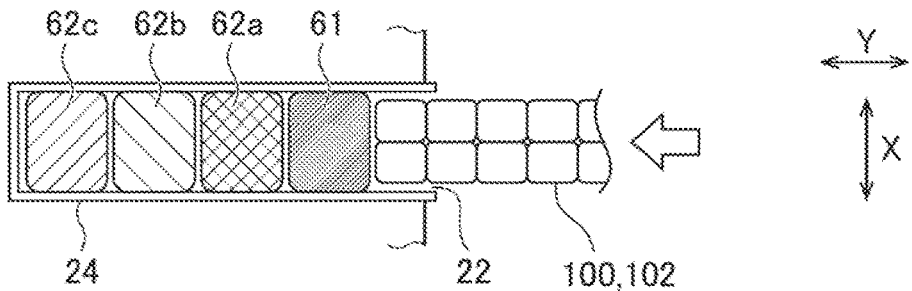
FIG. 11B is a diagram showing that the coil is inserted into the slot.

The belt-shaped coil 100 expanded in diameter comes into contact with the leading guide member 61 arranged ahead in the movement direction of the belt-shaped coil 100, and presses the leading guide member 61 outward in the radial direction of the stator core 2 by being further pressed by the coil presser 51. By being pressed by the belt-shaped coil 100, the leading guide member 61 moves outward in the radial direction to reduce the distance L against the energizing force of the elastic member 614. As a result, the leading guide member 61 pressed by the belt-shaped coil 100 comes into contact with or close to the first reinforcing guide member 62a arranged on the radially innermost side among the reinforcing guide members 62 (FIGS. 10B and 11B).

When the leading guide member 61 is pressed by the belt-shaped coil 100, a pushing force inward in the radial direction occurs on the leading guide member 61 due to the energizing force of the elastic member 614. Therefore, while moving, being pushed by the belt-shaped coil 100, the leading guide member 61 moves inside the piece of insulating paper 24 while pushing the belt-shaped coil 100 against the coil presser 51 inward in the radial direction. The belt-shaped coil 100 is thereby always constricted between the leading guide member 61 and the coil presser 51 while moving. Therefore, loosening of the belt-shaped coil 100 on the front side in the movement direction is prevented. In the present embodiment, the connecting plate 613 and the elastic member 614 constitute pushers that push the belt-shaped coil 100 inward in the radial direction of the stator core 2.

Figure 10C:
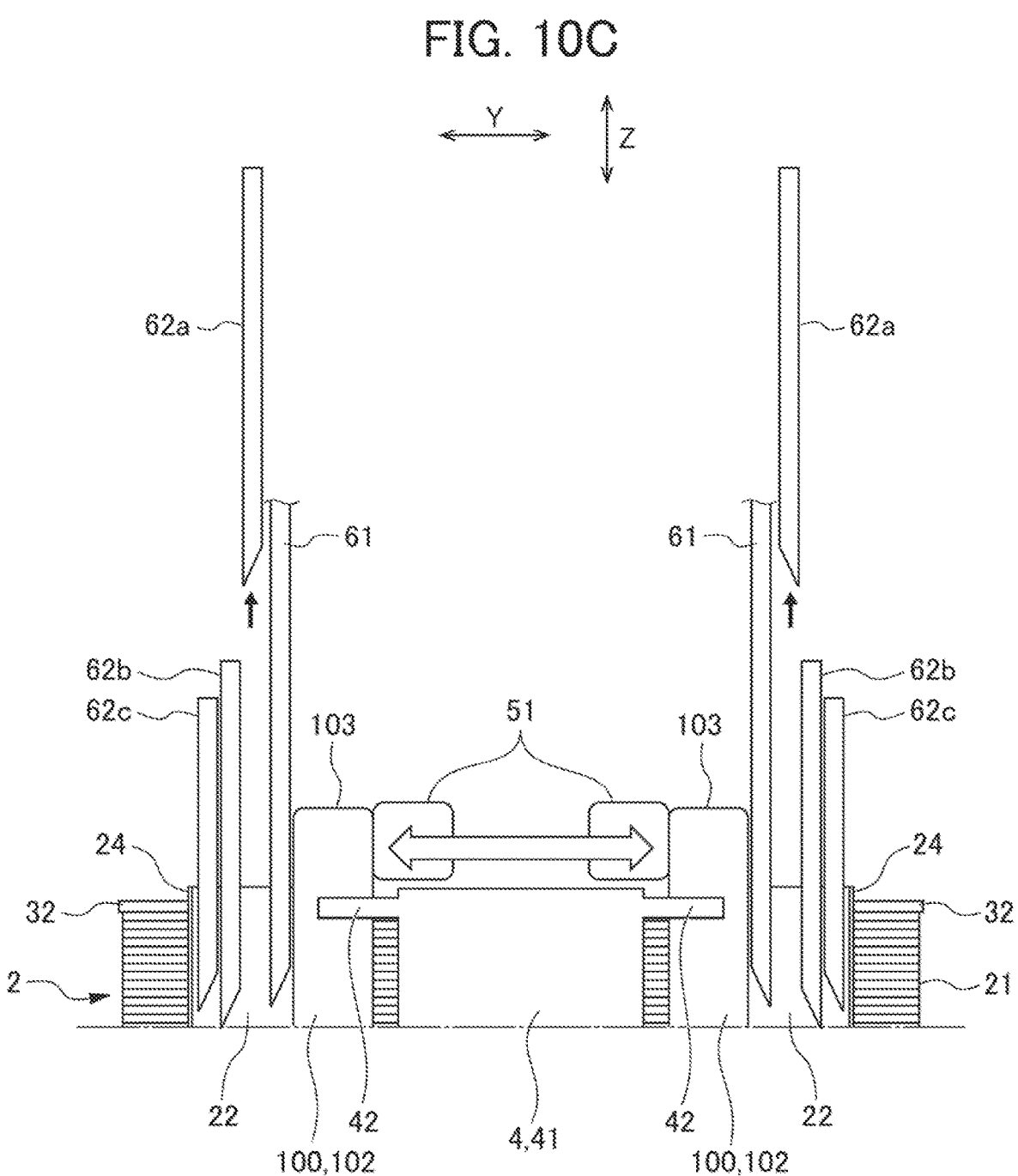
FIG. 10C is a diagram illustrating the operation process of inserting the coil into the slots from inside the stator core.
Figure 11C:
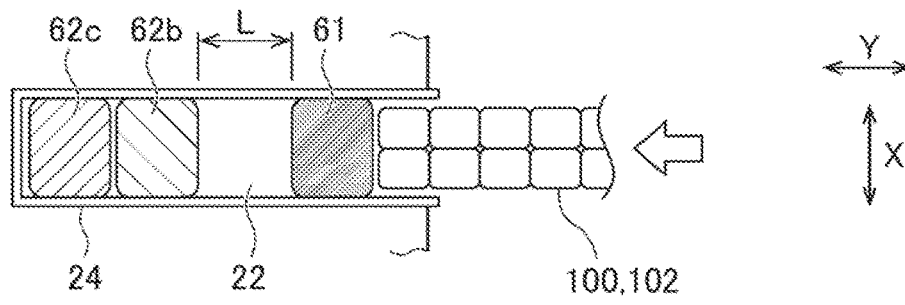
FIG. 11C is a diagram showing that the coil is inserted into the slot.

When the leading guide member 61 moves so as to reduce the distance L and comes into contact with or close to the first reinforcing guide member 62a on the radially innermost side, the controller 10 causes the first reinforcing guide actuator 620a to be driven to cause the first reinforcing guide member 62a to move outward in the central axis direction of the stator core 2. The first reinforcing guide member 62a thereby retreats from inside the piece of insulating paper 24 in the slot 22. The leading guide member 61 and the second reinforcing guide member 62b after the retreat of the first reinforcing guide member 62a are separated from each other by the distance L (FIGS. 10C and 11C).

Figure 10D:
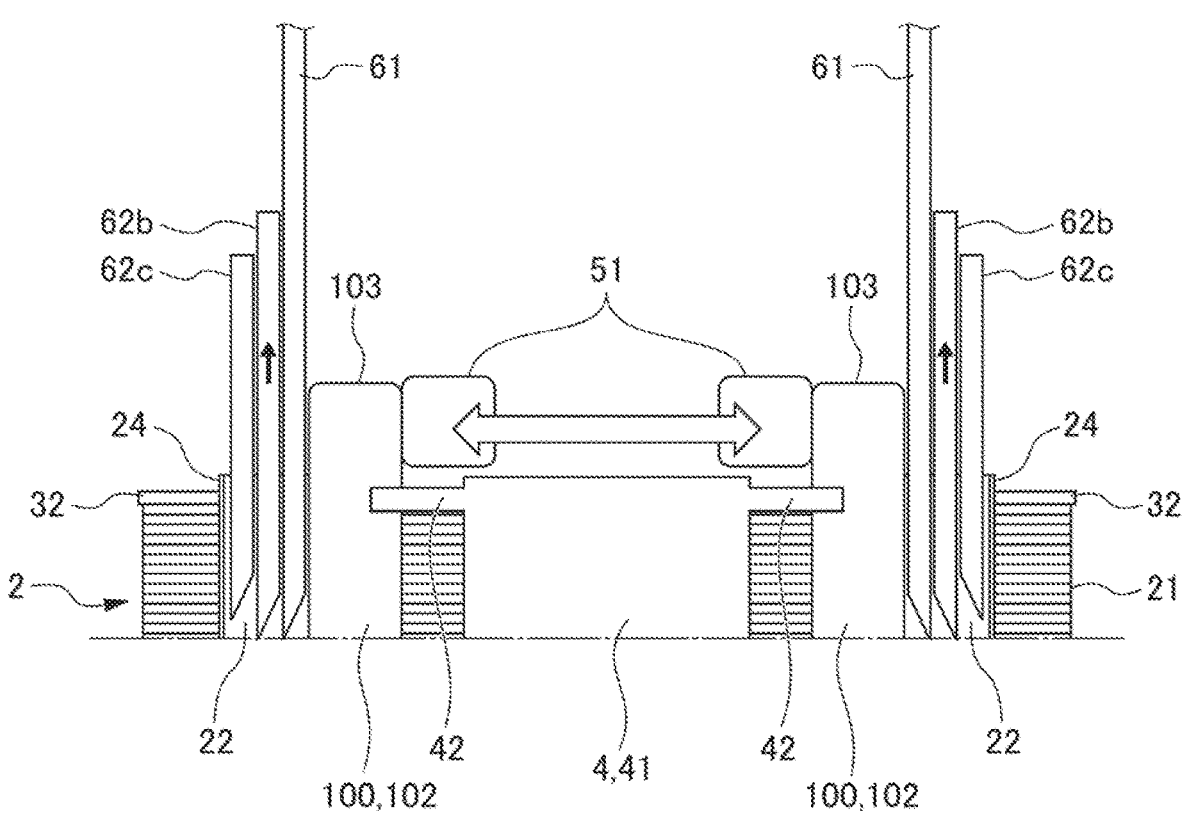
FIG. 10D is a diagram illustrating the operation process of inserting the coil into the slots from inside the stator core.
Figure 11D:
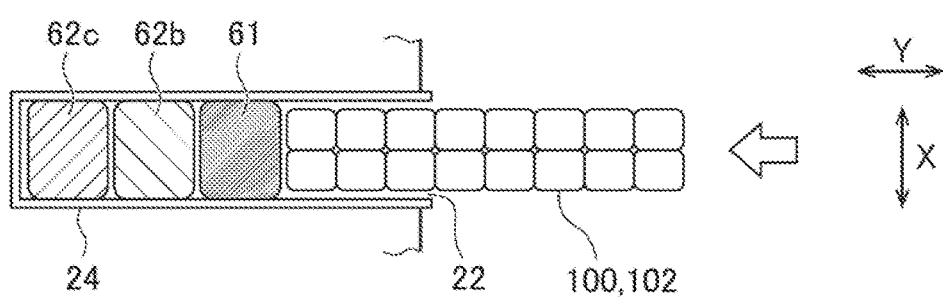
FIG. 11D is a diagram showing that the coil is inserted into the slot.

As the belt-shaped coil 100 further expands in diameter, the leading guide member 61 is pushed by the belt-shaped coil 100 and moves outward in the radial direction to reduce the distance L from the second reinforcing guide member 62b. As a result, the leading guide members 61 pressed by the belt-shaped coil 100 comes into contact with or close to the second reinforcing guide member 62b arranged on the radially innermost side, between the second reinforcing guide member 62b and the third reinforcing guide member 62c that remain in the slot 22 (FIGS. 10D and 11D).

Figure 10E:
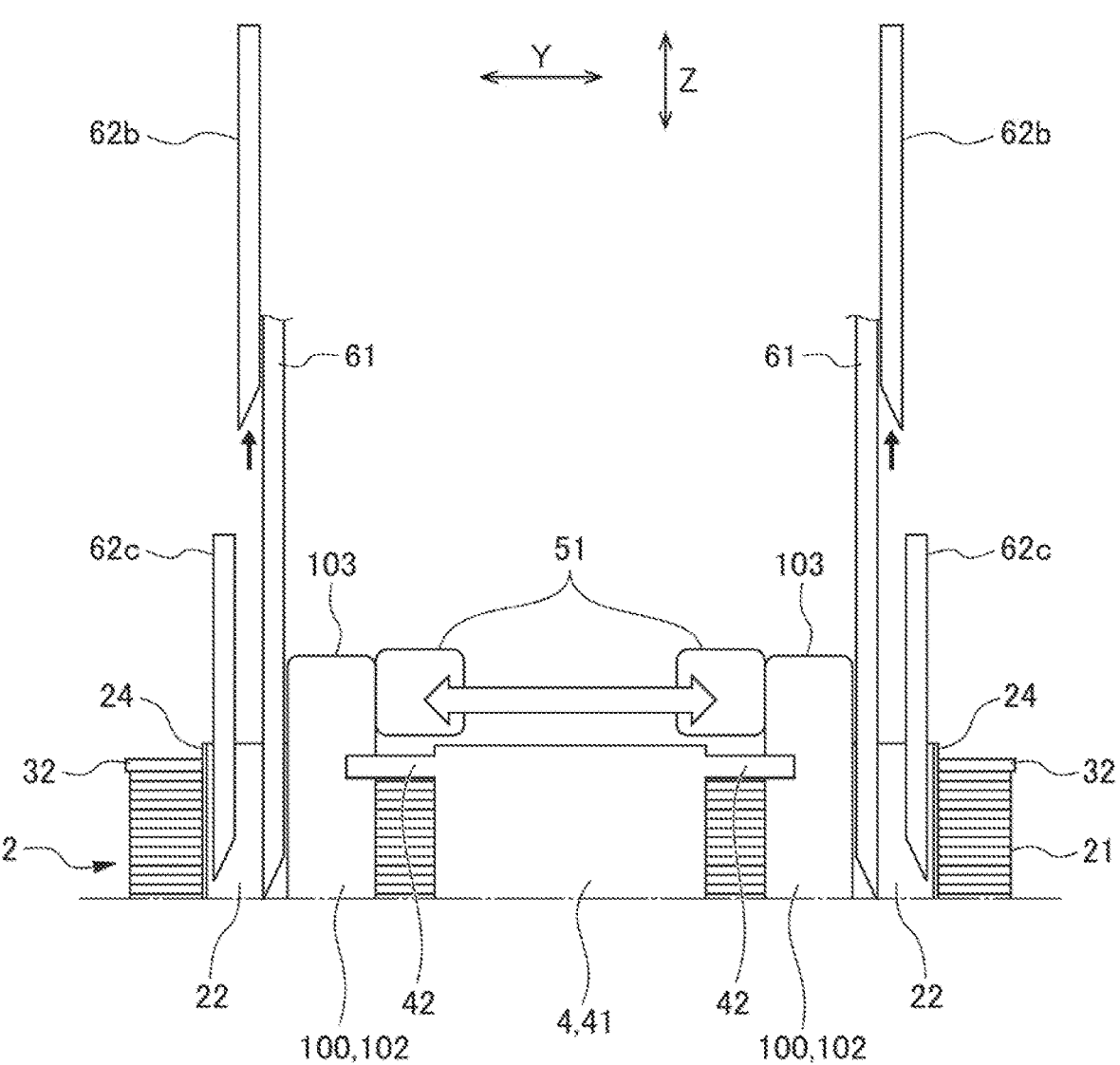
FIG. 10E is a diagram illustrating the operation process of inserting the coil into the slots from inside the stator core.
Figure 11E:
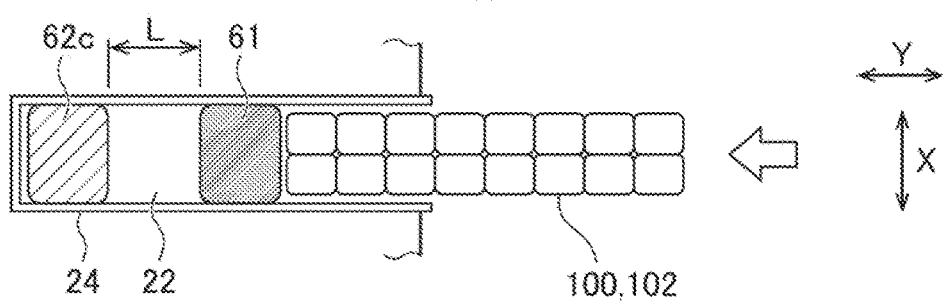
FIG. 11E is a diagram showing that the coil is inserted into the slot.

When the leading guide member 61 moves so as to reduce the distance L and comes into contact with or close to the second reinforcing guide member 62b, the controller 10 causes the second reinforcing guide actuator 620b to be driven to cause the second reinforcing guide member 62b to move outward in the central axis direction of the stator core 2. The second reinforcing guide member 62b thereby retreats from inside the piece of insulating paper 24 in the slot 22. The leading guide member 61 and the third reinforcing guide member 62c after the retreat of the second reinforcing guide member 62b are separated from each other by the distance L (FIGS. 10E and 11E).

Figure 10F:
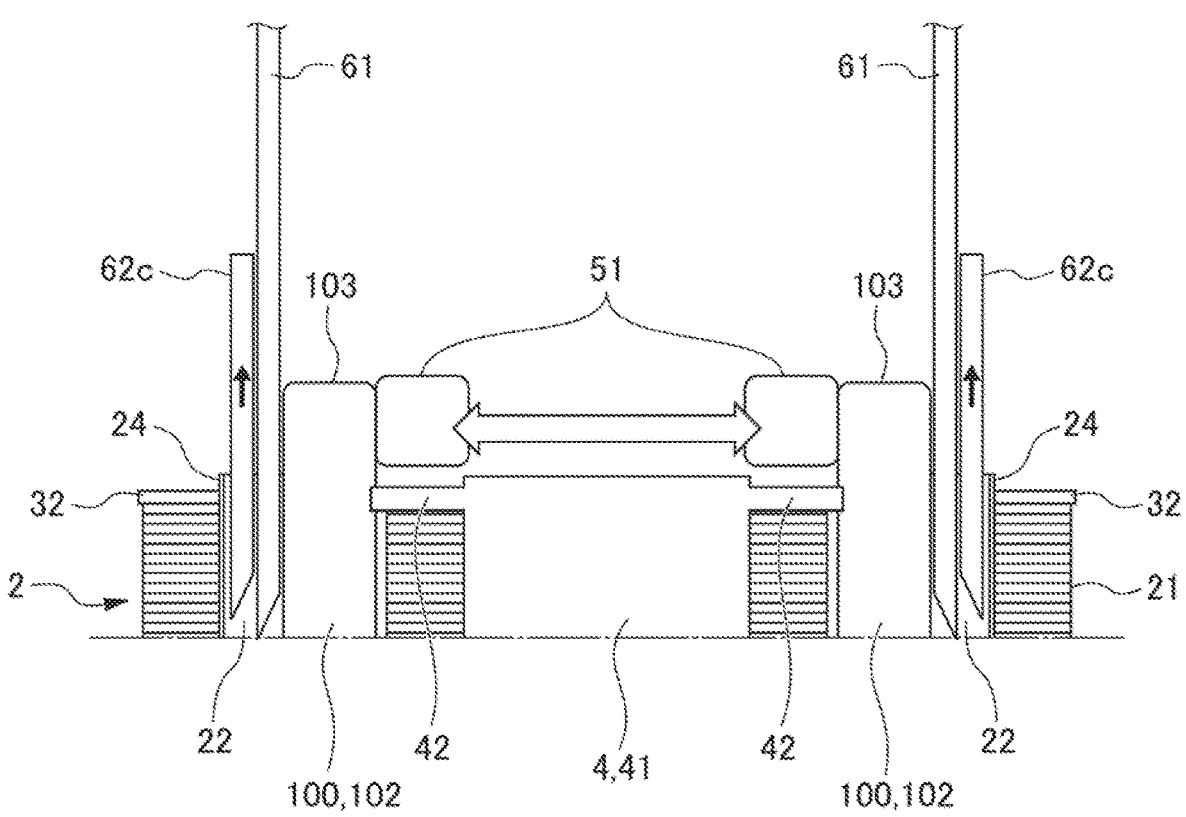
FIG. 10F is a diagram illustrating the operation process of inserting the coil into the slots from inside the stator core.
Figure 11F:
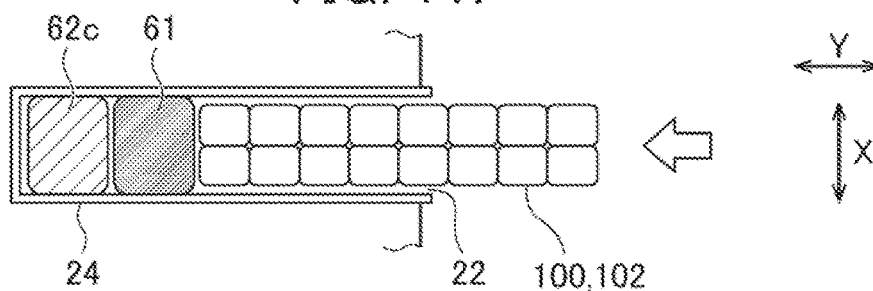
FIG. 11F is a diagram showing that the coil is inserted into the slot.

As the belt-shaped coil 100 further expands in diameter, the leading guide member 61 is pushed by the belt-shaped coil 100 and moves outward in the radial direction to reduce the distance L from the third reinforcing guide member 62c. As a result, the leading guide member 61 pressed by the belt-shaped coil 100 comes into contact with or close to the third reinforcing guide member 62c arranged on the radially innermost side, which remains in the slot 22 (FIGS. 10F and 11F).

Figure 10G:
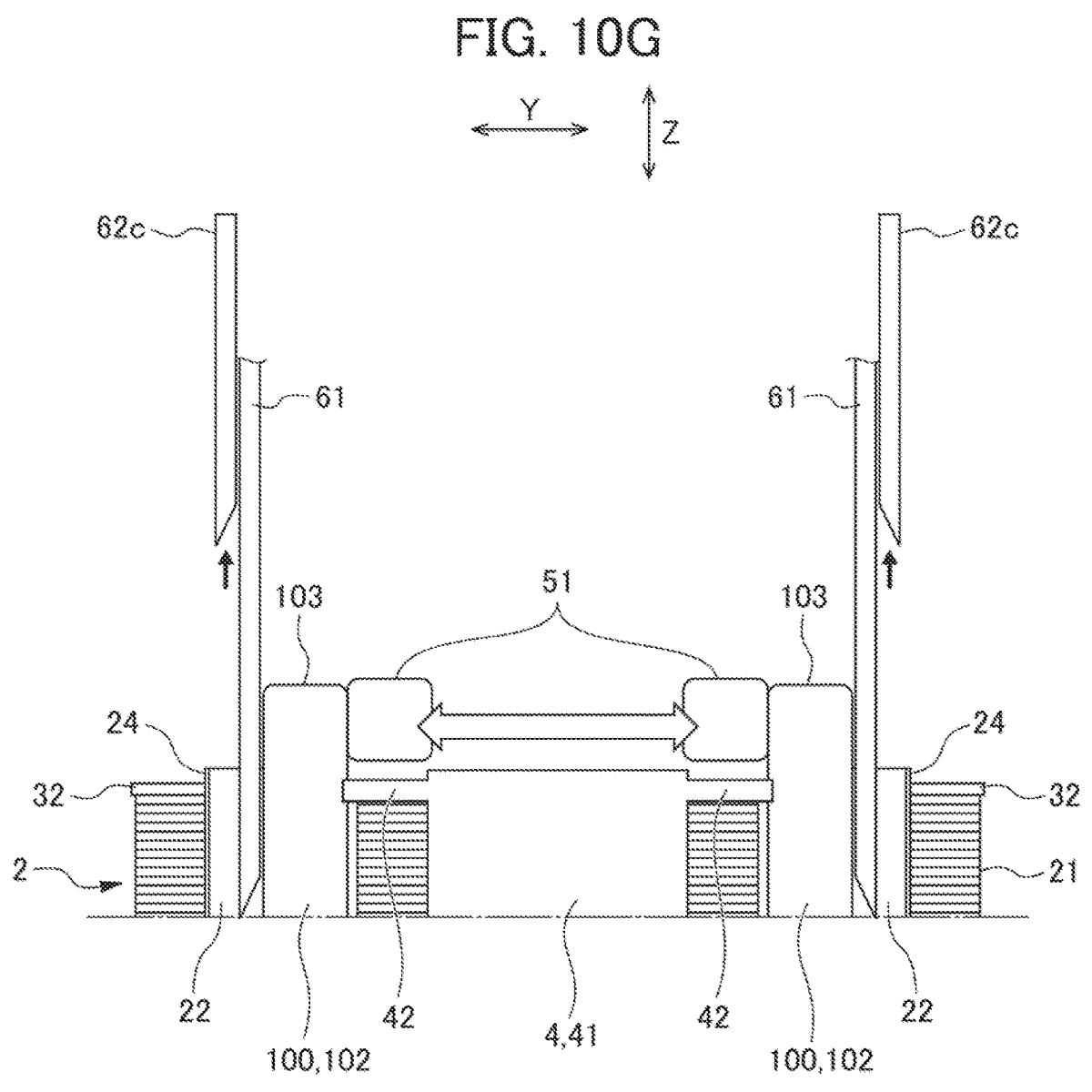
Figure 11G:
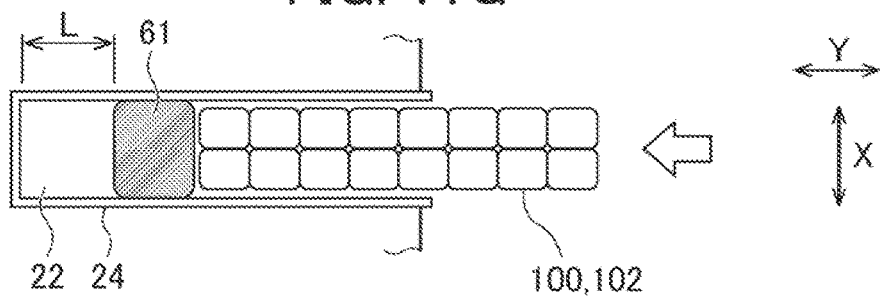
FIG. 11G is a diagram showing that the coil is inserted into the slot.

When the leading guide member 61 moves so as to reduce the distance L and comes into contact with or close to the third reinforcing guide member 62c, the controller 10 causes the third reinforcing guide actuator 620c to be driven to cause the third reinforcing guide member 62c to move outward in the central axis direction of the stator core 2. The third reinforcing guide member 62c thereby retreats from inside the piece of insulating paper 24 in the slot 22. Inside the piece of insulating paper 24 after the retreat of the third reinforcing guide member 62c, a gap corresponding to the distance L is formed on the outer side of the leading guide member 61 in the radial direction (FIGS. 10G and 11G).

Figure 10H:
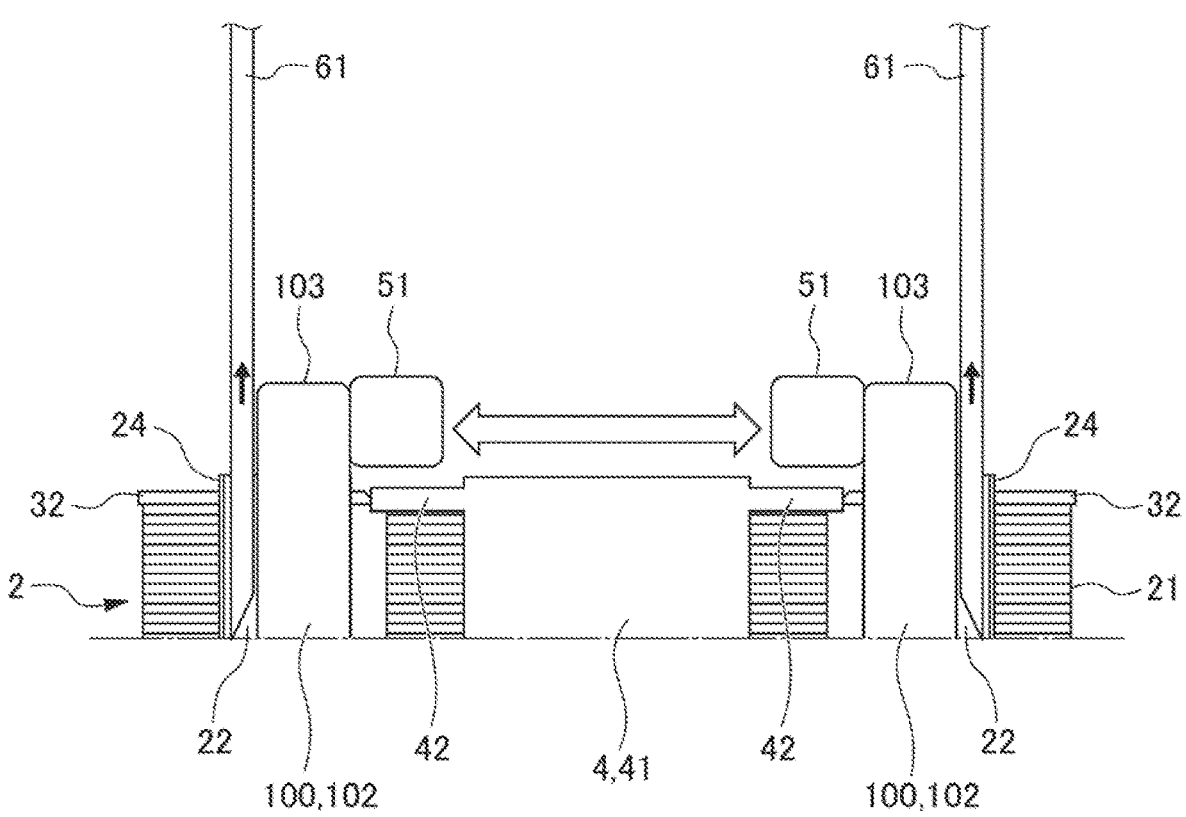
FIG. 10H is a diagram illustrating the operation process of inserting the coil into the slots from inside the stator core.
Figure 11H:
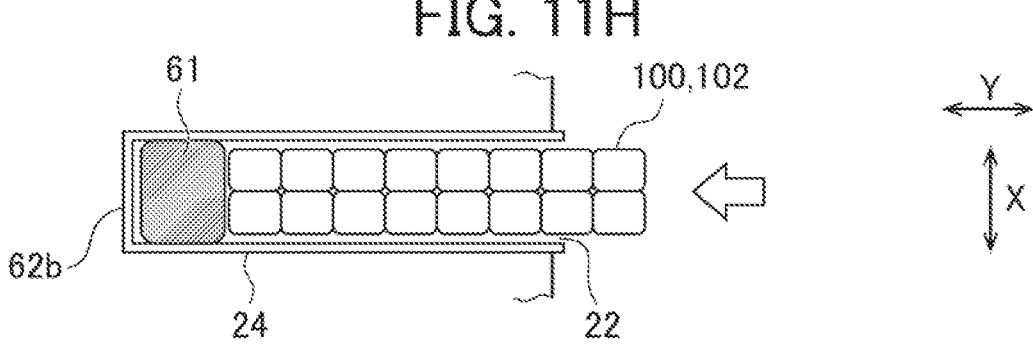
FIG. 11H is a diagram showing that the coil is inserted into the slot.

As the belt-shaped coil 100 further expands in diameter, the leading guide member 61 is pushed by the belt-shaped coil 100 and moves outward in the radial direction so as to reduce the distance L that remains in the slot 22. As a result, the leading guide member 61 pressed by the belt-shaped coil 100 comes into contact with or close to a wall surface 22b on the deepest side in the radial direction in the slot 22 (FIGS. 10H and 11H).

Figure 10I:
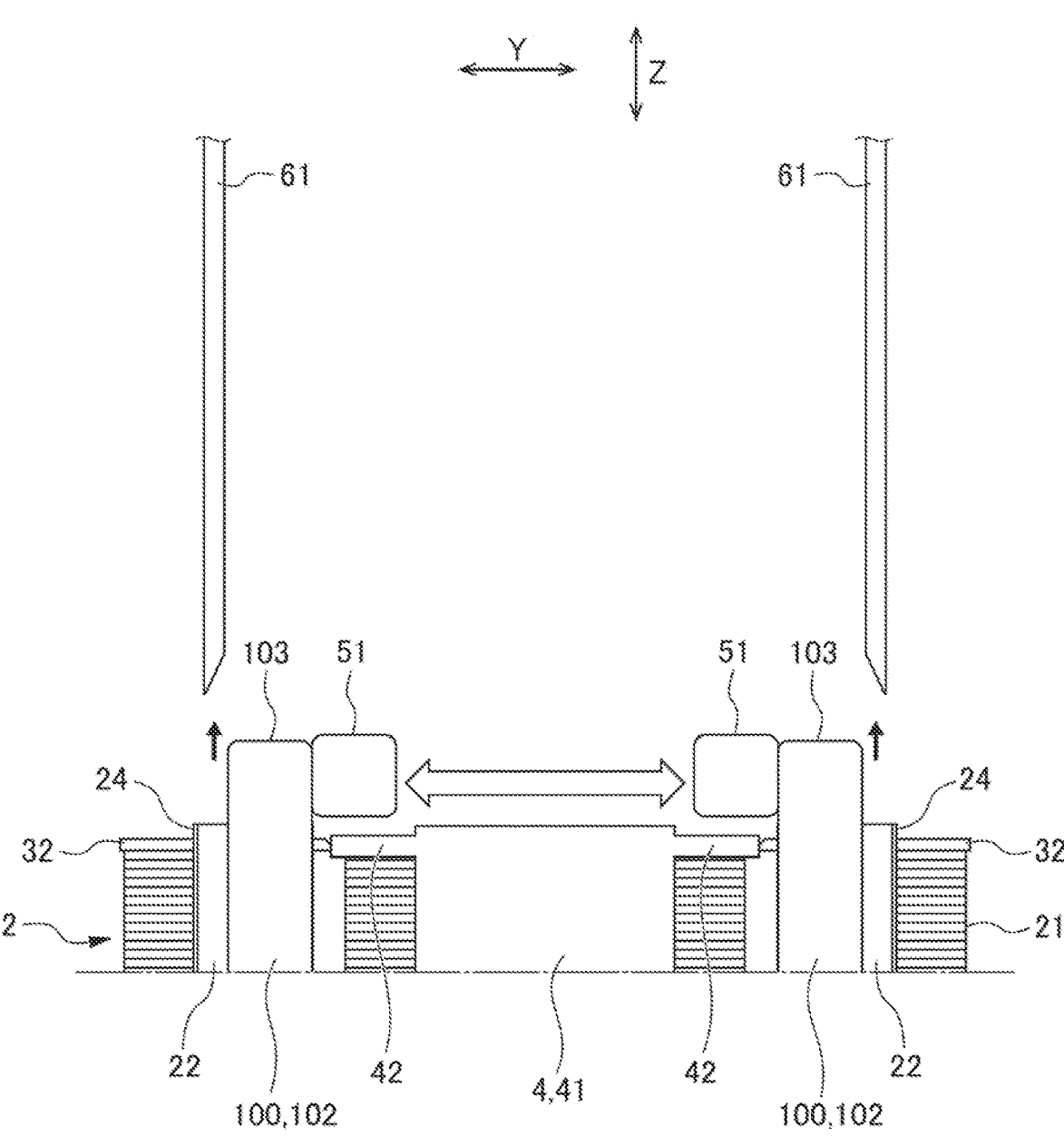
FIG. 10I is a diagram illustrating the operation process of inserting the coil into the slots from inside the stator core.
Figure 11I:
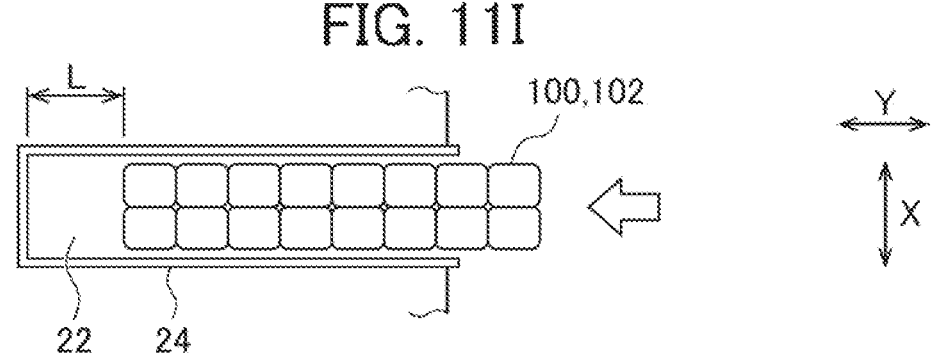
FIG. 11I is a diagram showing that the coil is inserted into the slot.

When the leading guide member 61 moves so as to reduce the distance L and comes into contact with or close to the wall surface 22b on the deepest side in the slot 22, the controller 10 causes the actuator 610 to be driven to cause the leading guide member 61 to move outward in the central axis direction of the stator core 2. The leading guide member 61 thereby retreats from inside the piece of insulating paper 24 in the slot 22. Inside the piece of insulating paper 24 after the retreat of the leading guide member 61, a gap corresponding to the distance L is formed between the straight portions 102 of the belt-shaped coil 100 and the wall surface 22b (FIGS. 10I and 11I).

Figure 10J:
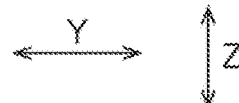
FIG. 10J is a diagram illustrating the operation process of inserting the coil into the slots from inside the stator core.
Figure 10J:
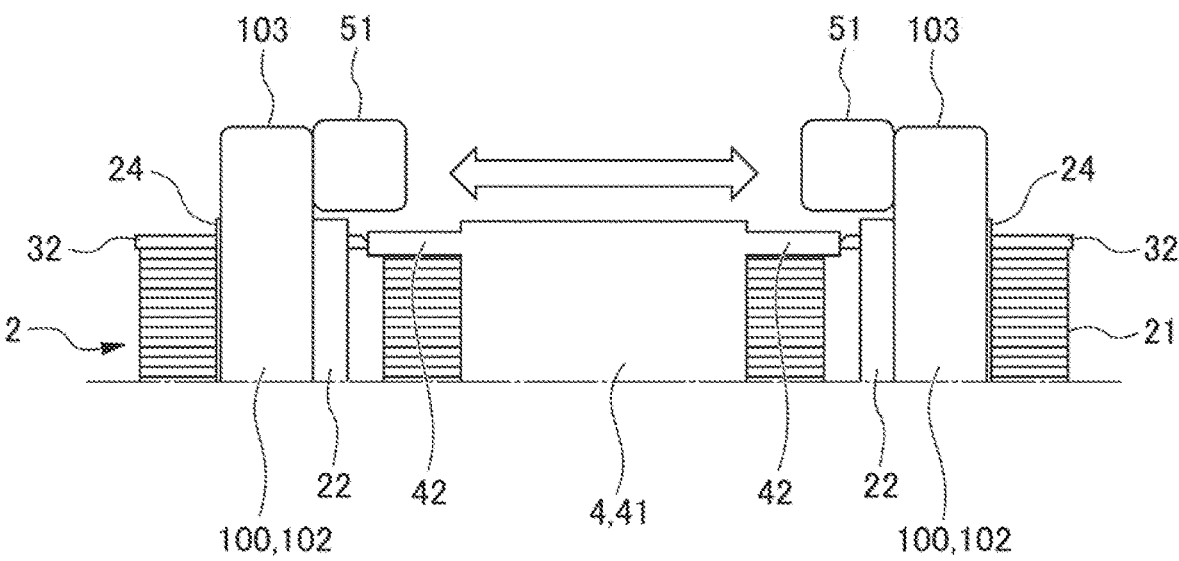
Figure 11J:
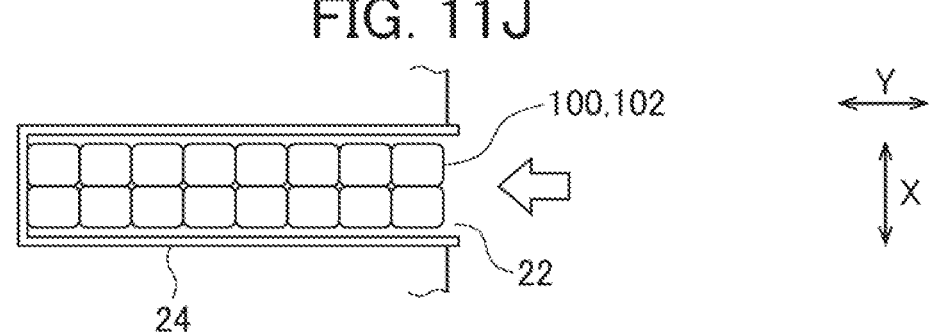
FIG. 11J is a diagram showing that the coil is inserted into the slot.
Figure 12:
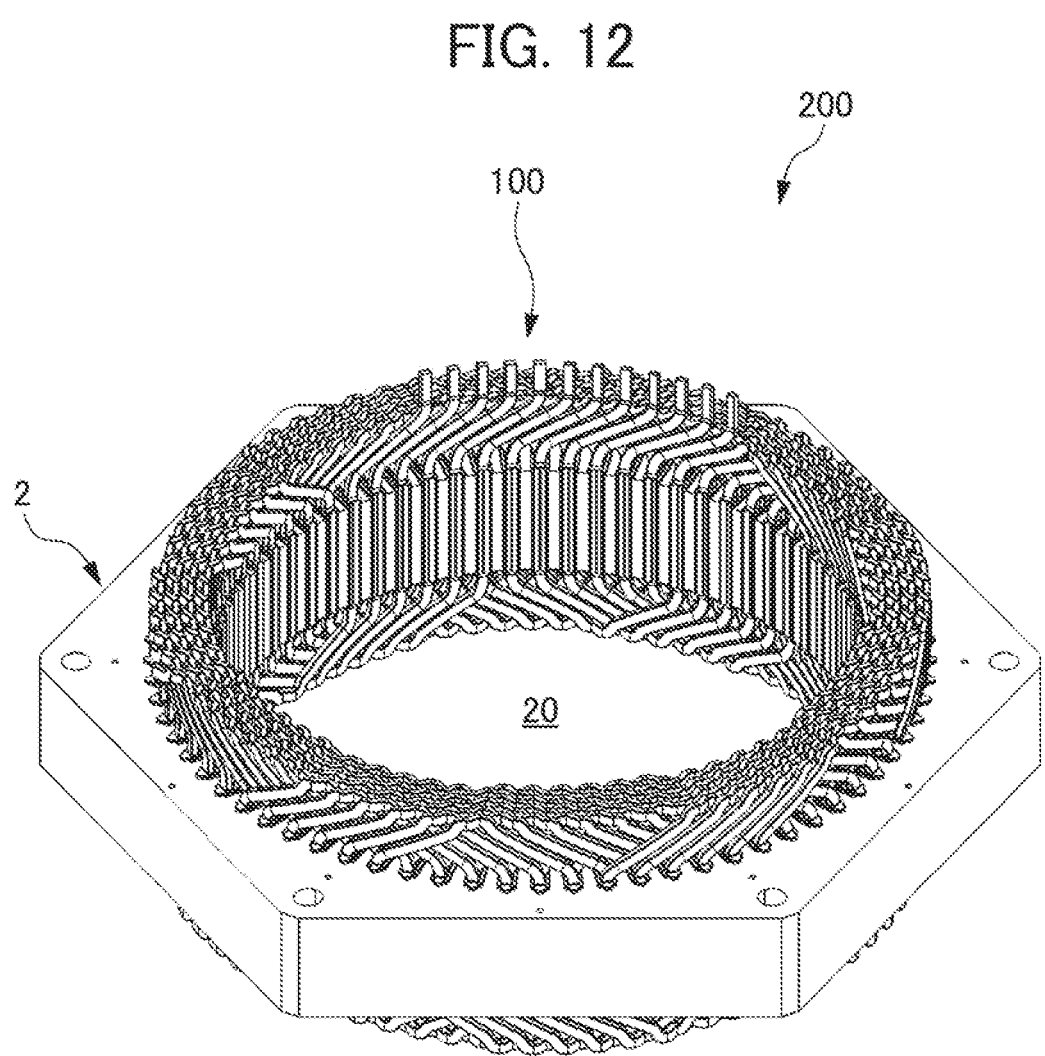
FIG. 12 is a perspective view showing the appearance of a stator.

When the belt-shaped coil 100 further expands in diameter, the belt-shaped coil 100 moves outward in the radial direction so as to reduce the distance L that remains in the slot 22. As a result, the straight portions 102 of the belt-shaped coil 100 are accommodated inside the piece of insulating paper 24 in the slot 22 (FIGS. 10J and 11J). The belt-shaped coil 100 is thereby mounted in the slots 22 of the stator core 2, and a stator 200 is completed (FIG. 12).

In the above embodiment, after the leading guide member 61 and the plurality of reinforcing guide members 62 are inserted inside each slot 22, the leading guide member 61 is retreated from the slot 22 last. However, the leading guide member 61 may be retreated first. An embodiment in which the leading guide member 61 is retreated first is shown in FIGS. 13A to 13J. FIGS. 13A to 13J schematically show the leading guide member 61 and the reinforcing guide members 62 in one slot 22 of the stator core 2. Since figures schematically showing an operation process of inserting the belt-shaped coil 100 wound around the coil winding jig 4 inside the piece of insulating paper 24 in each slot 22 of the stator core 2 from inside the stator core 2 are similar to FIGS. 10A to 10J except that the order of retreat of the leading guide member 61 and the reinforcing guide members 62 is different, the figures are omitted.

Figure 13A:
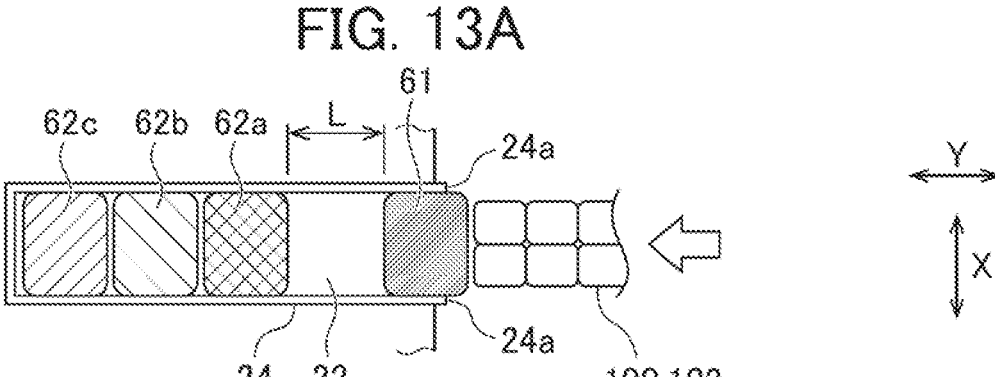
FIG. 13A is a diagram showing another embodiment in which a coil is inserted into each slot.

In the state immediately after all the leading guide members 61 and the reinforcing guide members 62 are inserted inside the pieces of insulating paper 24 in the slots 22, each leading guide member 61 is arranged between the paired opening ends 24a of the piece of insulating paper 24 similarly to the above embodiment, as shown in FIG. 13A. The first reinforcing guide member 62a, the second reinforcing guide member 62b, and the third reinforcing guide member 62c, which are the reinforcing guide members 62, are arranged in a state of being stacked on the outer side in the slot 22 (on the depth side of the slot 22) in the radial direction. The leading guide member 61 and the first reinforcing guide member 62a on the radially innermost side are separated from each other by the distance L. When the belt-shaped coil 100 is pressed by the coil presser 51 and gradually expands in diameter after insertion of the leading guide member 61 and the reinforcing guide members 62 is completed, the straight portions 102 gradually move toward the inside of the piece of insulating paper 24 in the slot 22 (FIG. 13A).

Figure 13B:
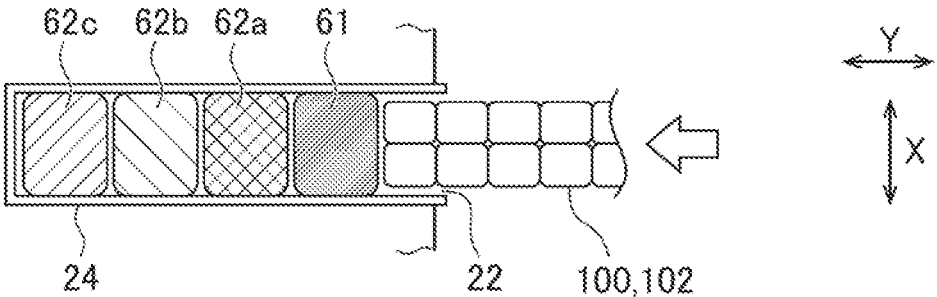
FIG. 13B is a diagram showing the other embodiment in which the coil is inserted into the slot.

The belt-shaped coil 100 expanded in diameter comes into contact with the leading guide member 61 arranged ahead in the movement direction of the belt-shaped coil 100, and presses the leading guide member 61 outward in the radial direction of the stator core 2 by being further pressed by the coil presser 51. By being pressed by the belt-shaped coil 100, the leading guide member 61 moves outward in the radial direction to reduce the distance L against the energizing force of the elastic member 614. As a result, the leading guide member 61 pressed by the belt-shaped coil 100 comes into contact with or close to the first reinforcing guide member 62a arranged on the radially innermost side among the reinforcing guide members 62 (FIG. 13B).

When the leading guide member 61 is pressed by the belt-shaped coil 100, a pushing force inward in the radial direction occurs on the leading guide member 61 due to the energizing force of the elastic member 614. Therefore, while moving, being pushed by the belt-shaped coil 100, the leading guide member 61 moves inside the piece of insulating paper 24 while pushing the belt-shaped coil 100 against the coil presser 51 inward in the radial direction. The belt-shaped coil 100 is thereby constricted between the leading guide member 61 and the coil presser 51 until the leading guide member 61 comes into contact with or close to the first reinforcing guide member 62a. Therefore, loosening of the belt-shaped coil 100 on the front side in the movement direction during the period is prevented.

Figure 13C:
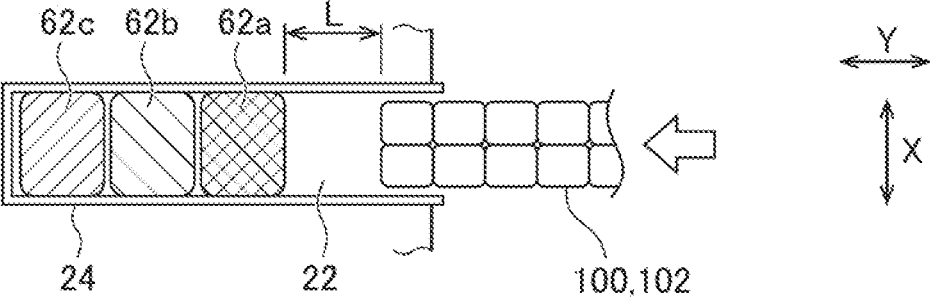
FIG. 13C is a diagram showing the other embodiment in which the coil is inserted into the slot.

When the leading guide member 61 moves so as to reduce the distance L and comes into contact with or close to the first reinforcing guide member 62a on the radially innermost side, the controller 10 causes the actuator 610 to be driven to cause the leading guide member 61 to move outward in the central axis direction of the stator core 2. The leading guide member 61 thereby retreats from inside the piece of insulating paper 24 in the slot 22. The belt-shaped coil 100 and the first reinforcing guide member 62a arranged on the radially innermost side after the retreat of the leading guide member 61 are separated from each other by the distance L (FIG. 13C).

Figure 13D:
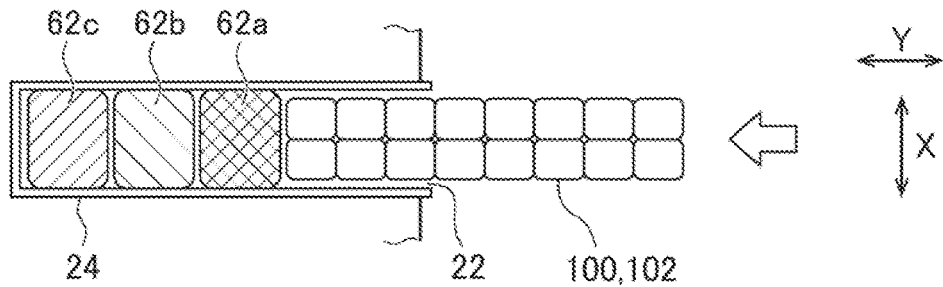
FIG. 13D is a diagram showing the other embodiment in which the coil is inserted into the slot.

As the belt-shaped coil 100 further expands in diameter, the belt-shaped coil 100 moves outward in the radial direction so as to reduce the distance L from the first reinforcing guide member 62a. As a result, the belt-shaped coil 100 comes into contact with or close to the first reinforcing guide member 62a arranged on the radially innermost side in the slot 22 (FIG. 13D).

Figure 13E:
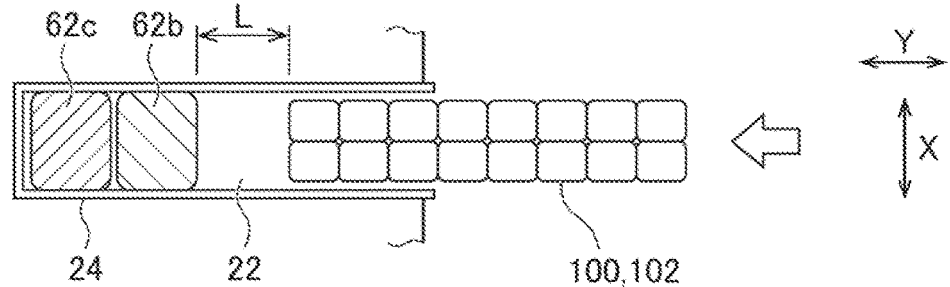
FIG. 13E is a diagram showing the other embodiment in which the coil is inserted into the slot.

When the belt-shaped coil 100 moves so as to reduce the distance L and comes into contact with or close to the first reinforcing guide member 62a, the controller 10 causes the first reinforcing guide actuator 620a to be driven to cause the first reinforcing guide member 62a to move outward in the central axis direction of the stator core 2. The first reinforcing guide member 62a thereby retreats from inside the piece of insulating paper 24 in the slot 22. The belt-shaped coil 100 and the second reinforcing guide member 62b arranged on the radially innermost side after the retreat of the first reinforcing guide member 62a are separated from each other by the distance L (FIG. 13E).

Figure 13F:
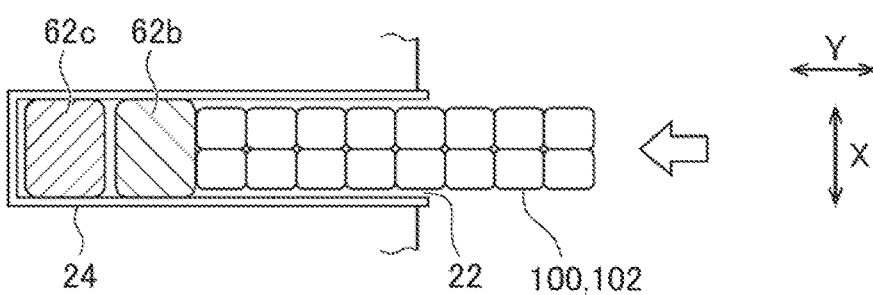
FIG. 13F is a diagram showing the other embodiment in which the coil is inserted into the slot.

As the belt-shaped coil 100 further expands in diameter, the belt-shaped coil 100 moves outward in the radial direction so as to reduce the distance L from the second reinforcing guide member 62b. As a result, the belt-shaped coil 100 comes into contact with or close to the second reinforcing guide member 62b arranged on the radially innermost side in the slot 22 (FIG. 13F).

Figure 13G:
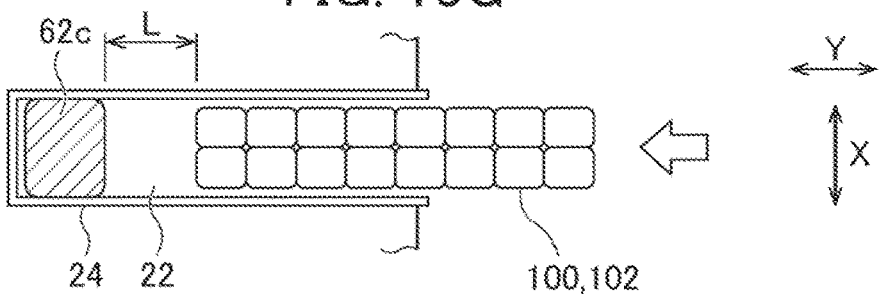
FIG. 13G is a diagram showing the other embodiment in which the coil is inserted into the slot.

When the belt-shaped coil 100 moves so as to reduce the distance L and comes into contact with or close to the second reinforcing guide member 62b, the controller 10 causes the second reinforcing guide actuator 620b to be driven to cause the second reinforcing guide member 62b to move outward in the central axis direction of the stator core 2. The second reinforcing guide member 62b thereby retreats from inside the piece of insulating paper 24 in the slot 22. The belt-shaped coil 100 and the third reinforcing guide member 62c arranged on the radially innermost side after the retreat of the second reinforcing guide member 62b are separated from each other by the distance L (FIG. 13G).

As the belt-shaped coil 100 further expands in diameter, the belt-shaped coil 100 moves outward in the radial direction so as to reduce the distance L that remains in the slot 22. As a result, the belt-shaped coil 100 comes into contact with or close to the third reinforcing guide member 62c that remains in the slot 22 (FIG. 13H).

When the belt-shaped coil 100 moves so as to reduce the distance L and comes into contact with or close to the third reinforcing guide member 62c that remains in the slot 22, the controller 10 causes the third reinforcing guide actuator 620c to be driven to cause the third reinforcing guide member 62c to move outward in the central axis direction of the stator core 2. The third reinforcing guide member 62c thereby retreats from inside the piece of insulating paper 24 in the slot 22. Inside the piece of insulating paper 24 after the retreat of the third reinforcing guide member 62c, a gap corresponding to the distance L is formed between the straight portions 102 of the belt-shaped coil 100 and the wall surface 22b (FIG. 13I).

When the belt-shaped coil 100 further expands in diameter, the belt-shaped coil 100 moves outward in the radial direction so as to reduce the distance L that remains in the slot 22. As a result, the straight portions 102 of the belt-shaped coil 100 are accommodated inside the piece of insulating paper 24 in the slot 22 (FIG. 13J).

According to the stator assembly apparatus 1 and the stator assembly method according to the above embodiment, the following effects can be obtained. That is, the stator assembly apparatus 1 is an apparatus for assembling the stator 200 by inserting the belt-shaped coil 100 into the slots 22 of the stator core 2 in which the pieces of insulating paper 24 are mounted, from inside the stator core 2. The stator assembly apparatus 1 is provided with: the coil pressers 51 of the coil expansion mechanism units 5 pressing the belt-shaped coil 100 outward in the radial direction to cause the belt-shaped coil 100 to move into the insides of the pieces of insulating paper 24 in the slots 22; the leading guide members 61 provided movably along the central axis direction of the stator core 2 and inserted into the insides of the pieces of insulating paper 24 in the slots 22 by moving toward the stator core 2, each one of the slots 22 being provided with one leading guide member 61; the reinforcing guide members 62 provided movably along the central axis direction of the stator core 2 and inserted into the insides of the pieces of insulating paper 24 and onto the outer side relative to the leading guide members 61 in the radial direction in the slots 22 by moving toward the stator core 2, each one of the slots 22 being provided with a plurality of reinforcing guide members 62; and the controller 10 controlling movement of each of the leading guide members 61 and the reinforcing guide members 62 along the central axis direction of the stator core. Each of the leading guide members 61 is inserted into the slots 22, positioned ahead in the movement direction of the belt-shaped coil 100 that is moved by the coil pressers 51 of the coil expansion mechanism unit 5, in the state of a part thereof being in contact with the opening ends 24a of the piece of insulating paper 24 in the slot 22, and provided movably outward in the radial direction in the slot 22 by being pressed by the belt-shaped coil 100. The controller performs control so as to, after the leading guide member 61 moves outward in the radial direction in the slot 22 until coming into contact with or close to a reinforcing guide member 62 arranged on a radially inner side among the plurality of reinforcing guide members 62 (any of the first reinforcing guide member 62a, the second reinforcing guide member 62b and the third reinforcing guide member 62c), cause the reinforcing guide members 62 (the first reinforcing guide member 62a, the second reinforcing guide member 62b and the third reinforcing guide member 62c) to sequentially move to an outer side of the stator core 2 in the central axis direction in order with the reinforcing guide member 62 closest to the leading guide member 61 first and retreat from the slot 22.

The stator assembly method is a method for assembling the stator 200 by inserting the belt-shaped coil 100 into the slots 22 of the stator core 2 in which the pieces of insulating paper 24 are mounted, from inside the stator core 2. The method includes the processes of: inserting, before inserting the belt-shaped coil 100 into the slots 22, at least one leading guide member 61 into each one of the slots 22 from outside in the central axis direction of the stator core 2 such that the leading guide member 61 is arranged inside the piece of insulating paper 24 in the slot 22, and inserting reinforcing guide members 62 (the first reinforcing guide member 62a, the second reinforcing guide member 62b and the third reinforcing guide member 62c) into the one slot 22 such that the reinforcing guide members 62 are arranged inside the piece of insulating paper 24 and on the outer side relative to the leading guide member 61 in the radial direction in the slot 22; causing the belt-shaped coil 100 to move toward the slot 22 to cause the belt-shaped coil 100 to come into contact with the leading guide member 61 in the state of a part of the leading guide member 61 being in contact with the opening ends 24a, and causing the leading guide member 61 to move outward in the radial direction in the slot 22, accompanying the movement of the belt-shaped coil 100; and, after the leading guide member 61 moves outward in the radial direction in the slot 22 until coming into contact with or close to a reinforcing guide member 62 arranged on a radially inner side (any of the first reinforcing guide member 62a, the second reinforcing guide member 62b and the third reinforcing guide member 62c) among the plurality of reinforcing guide members 62, causing the first reinforcing guide member 62a, the second reinforcing guide member 62b, and the third reinforcing guide member 62c to sequentially move to the outer side of the stator core 2 in the central axis direction in order with the reinforcing guide member 62 closest to the leading guide member 61 first and retreat from the slot 22.

According to the above, at the time of inserting the belt-shaped coil 100 into each slot 22 from inside the stator core 2, a leading guide member 61 and a plurality of reinforcing guide members 62 (a first reinforcing guide member 62a, a second reinforcing guide member 62b and a third reinforcing guide member 62c) support the piece of insulating paper 24 mounted in the slot 22 so as to open the piece of insulating paper 24, and, in the process of the leading guide member 61 moving in the slot 22 being pressed by the belt-shaped coil 100, the first reinforcing guide member 62a, the second reinforcing guide member 62b and the third reinforcing guide member 62c sequentially retreat from inside the slot 22. Therefore, it is possible to keep the space in the slot 22 equal to or smaller than a set thickness (the thickness of the guide members in the radial direction). It is possible thereby to insert the belt-shaped coil 100 into the slots 22 without catching or rolling the pieces of insulating paper 24 and improve buckling resistance of the pieces of insulating paper 24. Further, by changing the thickness of each of the guide members 62a, 62b, and 62c in the radial direction, it is possible to easily cope with the tension (rigidity) of the belt-shaped coil 100 and change in the insertion load.

In the case where, in the stator assembly apparatus 1, the controller 10 performs control so as to, after the leading guide member 61 moves outward in the radial direction in the slot 22 until coming into contact with or close to the first reinforcing guide member 62a arranged on the radially inner side among the plurality of reinforcing guide members 62, cause the leading guide member 61 to move outward in the central axis direction of the stator core 2 and retreat from the slot 22 first and then, as the belt-shaped coil 100 is moved outward in the radial direction by the coil presser 51 of the coil expansion mechanism unit 5, cause the plurality of reinforcing guide members 62 (the first reinforcing guide member 62a, the second reinforcing guide member 62b, and the third reinforcing guide member 62c) to sequentially move outward in the central axis direction of the stator core 2 and retreat from the slot 22 in order with the first reinforcing guide member 62a on the radially inner side first, and in the case where the stator assembly method includes the process of, after the leading guide member 61 moves outward in the radial direction in the slot 22 until coming into contact with or close to the first reinforcing guide member 62a arranged on the radially inner side among the plurality of reinforcing guide members 62, causing the leading guide member 61 to move outward in the central axis direction of the stator core 2 and retreat from the slot 22 first and then, as the belt-shaped coil 100 moves outward in the radial direction, causing the plurality of reinforcing guide members 62 (the first reinforcing guide member 62a, the second reinforcing guide member 62b, and the third reinforcing guide member 62c) to sequentially move outward in the central axis direction of the stator core 2 and retreat from the slot 22 in order with the first reinforcing guide member 62a on the radially inner side first, since the leading guide member 61 retreats from the slot 22 first, the distance the leading guide member 61 moves in the radial direction scraping the piece of insulating paper 24 can be reduced, and it is also possible to prevent the pieces of insulating paper 24 from coming into contact with the leading guide member 61 moving in the radial direction and being twisted, in addition to the above effects.

In the stator assembly apparatus 1 and the stator assembly method in each embodiment, the connecting plate 613 and the elastic member 614, which are pushers that push each leading guide member 61 to the belt-shaped coil 100 inward in the radial direction of the stator core 2, and the leading guide member 61 pushes the belt-shaped coil 100 inward in the radial direction of the stator core 2 while moving, being pushed by the belt-shaped coil 100. According thereto, since the leading guide member 61 can push the belt-shaped coil 100 inward in the radial direction of the stator core 2 while moving, being pushed by the belt-shaped coil 100 that is moving toward the inside of the slot 22, it is possible to prevent loosening of the belt-shaped coil 100 on the front side in the movement direction.

Each leading guide member 61 is arranged such that, in a state of being inserted in the slot 22 before the belt-shaped coil 100 is inserted, at least a part of the leading guide member 61 is in contact with the opening ends 24a of the piece of insulating paper 24 in the slot 22. According thereto, by the leading guide member 61 being arranged between the opening ends 24a of the piece of insulating paper 24, it is possible to keep the opening ends 24a of the piece of insulating paper 24 in an opened state prior to insertion of the belt-shaped coil 100. Since the belt-shaped coil 100 moving toward the slot 22 and the piece of insulating paper 24 are thereby prevented from coming into contact with each other, it is possible to smoothly introduce the belt-shaped coil 100 into the inside of the piece of insulating paper 24.

In each embodiment, the leading guide members 61 and the reinforcing guide members 62 are arranged on each of both sides of the stator core 2 in the central axis direction such that the leading and reinforcing guide members on both sides face each other and arranged so that, when being inserted into the slots 22 from both outsides of the stator core 2 in the central axis direction, tips face each other in the slots 22. According thereto, since the distances of movements of the leading guide members 61 and the reinforcing guide members 62 to the slots 22 are reduced, it is possible to miniaturize the apparatus and save space.

In each embodiment, the longitudinal widths W11 and W12 of the leading guide members 61 and the reinforcing guide members 62 along the radial direction of the stator core 2 are substantially the same widths. According thereto, it is possible to, at the time of causing the first reinforcing guide member 62a, the second reinforcing guide member 62b and the third reinforcing guide member 62c to sequentially retreat from inside the slot 22, accompanying movement of the belt-shaped coil 100 and each leading guide member 61, keep the width of a gap in the slot 22 along the radial direction equal to or smaller than a predetermined width. Therefore, it is possible to enable the effect of supporting the piece of insulating paper 24 by the leading guide member 61 and the reinforcing guide members 62 so as to open the piece of insulating paper 24 and the effect of improving the insertability of the belt-shaped coil 100.

In each embodiment, the lateral widths W12 and W22 of the leading guide members 61 and the reinforcing guide members 62 along the circumferential direction of the stator core 2 are equal to or more than the width W0 of the belt-shaped coil 100 along the circumferential direction of the stator core 2. According thereto, due to the state of the leading guide member 61 and the reinforcing guide members 62 supporting the piece of the insulating paper 24 so as to open the piece of insulating paper 24, it is possible to more certainly prevent the straight portions 102 of the belt-shaped coil 100 moving toward the inside of the slot 22 from catching the pieces of insulating paper 24 in the slot 22.

The stator assembly apparatus 1 in each embodiment described above is configured such that the central axis direction of the stator core 2 and the coil winding jig 4 is arranged in the horizontal direction. However, the stator assembly apparatus 1 may be configured such that the central axis direction of the stator core 2 and the coil winding jig 4 is arranged in a direction other than the horizontal direction, such as the vertical direction.

EXPLANATION OF REFERENCE NUMERALS

1 stator assembly apparatus
10 controller
2 stator core
22 slot
24 insulating paper (insulating member)
24a opening end
51 coil presser (presser)
61 leading guide member (first guide member)
613 connecting plate (pusher)
614 elastic member (pusher)
62 reinforcing guide member (second guide member)

62a first reinforcing guide member
62b second reinforcing guide member
62c third reinforcing guide member
100 belt-shaped coil
200 stator
W0 width of belt-shaped coil
W11, W21 longitudinal width
W12, W22 lateral width

What is claimed is:

1. A stator assembly apparatus for assembling a stator by inserting a coil into slots of a stator core from inside the stator core, the stator assembly apparatus comprising:

the stator core having a through-hole penetrating in an axial direction at a center thereof and the slots that are open to the through-hole and to which insulating members are mounted, and the coil that is wound annularly and is to be arranged in the through-hole, pressing parts that are arranged annularly and adapted to be expanded and reduced in diameter, the pressing parts each having an outer diameter in a diameter-reduced state which is equal to or smaller than an inner diameter of the coil, the pressing parts being configured to press, by expanding in diameter, the coil outward in a radial direction to cause the coil to move into insides of the insulating members in the slots;

first rod-shaped bodies provided movably along a central axis direction of the stator core and inserted into the insides of the insulating members in the slots by moving toward the stator core, each one of the slots being provided with at least one of the first rod-shaped bodies;

second rod-shaped bodies provided movably along the central axis direction of the stator core and inserted into the insides of the insulating members and onto outer sides relative to the first rod-shaped bodies in the radial direction in the slots by moving toward the stator core, each one of the slots being provided with a plurality of the second rod-shaped bodies; and a controller controlling movement of each of the first rod-shaped bodies and the second rod-shaped bodies along the central axis direction of the stator core, and operation of expansion and reduction in diameter of the pressing parts;

the at least one of the first rod-shaped bodies being positioned ahead in a movement direction of the coil moved by being pressed by the pressing parts, in a state of being inserted in the slot, and being provided movably outward in the radial direction in the slot by being pushed by the coil; and the controller performing control so as to, after the at least one of the first rod-shaped bodies moves outward in the radial direction in the slot until coming into contact with or close to a second rod-shaped body arranged on a radially inner side among the plurality of second rod-shaped bodies, cause the plurality of second rod-shaped bodies to sequentially move to an outer side of the stator core in the central axis direction in order with the second rod-shaped body closest to the at least one of the first rod-shaped bodies first and retreat from the slot as the coil is moved outward in the radial direction by the pressing parts.

2. The stator assembly apparatus according to claim 1, comprising springs energizing the first rod-shaped bodies inward in the radial direction of the stator core in order to push the first rod-shaped bodies against the coil.

3. The stator assembly apparatus according to claim 1, wherein the at least one of the first rod-shaped bodies is arranged such that, in a state of being inserted in the slot before the coil is inserted, at least a part of the at least one of the first rod-shaped bodies is in contact with opening ends of the insulating member in the slot.

4. The stator assembly apparatus according to claim 1, wherein the first rod-shaped bodies and the second rod-shaped bodies are arranged on each of both sides of the stator core in the central axis direction such that the first and second rod-shaped bodies on both sides face each other and arranged so that, when being inserted into the slots from both outsides of the stator core in the central axis direction, tips face each other in the slots.

5. The stator assembly apparatus according to claim 1, wherein longitudinal widths of the first rod-shaped bodies and the second rod-shaped bodies along the radial direction of the stator core are substantially the same widths.

6. A stator assembly method providing a stator assembly apparatus of claim 1 for assembling a stator, the stator including a stator core having a through-hole penetrating in an axial direction at a center thereof and slots that are open to the through-hole and to which insulating members are mounted, and a coil that is wound annularly and is to be arranged in the through-hole, the stator being assembled by inserting the coil into the slots provided in the stator core from inside the stator core, the stator assembly method comprising the processes of:

inserting, before inserting the coil into the slots, at least one of the first rod-shaped bodies into each one of the slots from outside in a central axis direction of the stator core such that the at least one of the first rod-shaped bodies is arranged inside the insulating member in the slot, and inserting a plurality of the second rod-shaped bodies into each one of the slots such that the plurality of second rod-shaped bodies are arranged inside the insulating member and on an outer side relative to the at least one of the first rod-shaped bodies in a radial direction in the slot;

causing the coil to move toward the slot by operation of expansion in diameter of the pressing parts to cause the coil to come into contact with the at least one of the first rod-shaped bodies, and causing the at least one of the first rod-shaped bodies to move outward in the radial direction in the slot, accompanying the movement of the coil; and after the at least one of the first rod-shaped bodies moves outward in the radial direction in the slot until coming into contact with or close to a second rod-shaped body arranged on a radially inner side among the plurality of second rod-shaped bodies, causing the plurality of second rod-shaped bodies to sequentially move to an outer side of the stator core in the central axis direction in order with the second rod-shaped body closest to the at least one of the first rod-shaped bodies first and retreat from the slot as the coil is moved outward in the radial direction by operation of expansion in diameter of the pressing parts.

7. The stator assembly method according to claim 6, wherein the at least one of the first rod-shaped bodies pushes the coil inward in the radial direction of the stator core while moving, being pushed by the coil.

8. The stator assembly method according to claim 6, wherein, in the process of inserting at least one of the first rod-shaped bodies and a plurality of second rod-shaped bodies into each one of the slots, the at least one of the first rod-shaped bodies is inserted into the slot such that at least a part of the at least one of the first rod-shaped bodies is in contact with opening ends of the insulating member in the slot.

9. The stator assembly method according to claim 6, wherein the first rod-shaped bodies and the second rod-shaped bodies are arranged on each of both sides of the stator core in the central axis direction such that the first and second rod-shaped bodies on both sides face each other; and in the process of inserting at least one of the first rod-shaped bodies and a plurality of the second rod-shaped bodies into each one of the slots, at least one of the first rod-shaped bodies and a plurality of the second rod-shaped bodies are inserted into each one of the slots from each of both outsides of the stator core in the central axis direction and are arranged such that tips face each other in the slot.

10. The stator assembly method according to claim 6, wherein longitudinal widths of the first rod-shaped bodies and the second rod-shaped bodies along the radial direction of the stator core are substantially the same widths.

\* \* \* \* \*